United States Patent [19]
Fukushima

[11] Patent Number: 5,295,062
[45] Date of Patent: Mar. 15, 1994

[54] FACILITY MANAGEMENT APPARATUS HAVING TOUCH RESPONSIVE DISPLAY SCREENS

[75] Inventor: Hiroki Fukushima, Kanagawa, Japan

[73] Assignee: Yamatake-Honeywell Co., Ltd., Japan

[21] Appl. No.: 643,542

[22] Filed: Jan. 18, 1991

[30] Foreign Application Priority Data

Jan. 19, 1990 [JP] Japan .................................. 2-9903

[51] Int. Cl.⁵ ............................................ G05B 15/02
[52] U.S. Cl. .................................. 364/188; 364/189; 395/159; 345/173
[58] Field of Search ............... 364/188, 189, 505, 514; 340/712, 715; 395/159, 161

[56] References Cited

U.S. PATENT DOCUMENTS

| | | | |
|---|---|---|---|
| 4,805,089 | 2/1989 | Lane et al. | 364/188 |
| 4,833,592 | 5/1989 | Yamanaka | 364/188 |
| 4,918,615 | 4/1990 | Suzuki et al. | 364/505 |
| 4,962,473 | 10/1990 | Crain | 364/514 |
| 4,991,077 | 2/1991 | Kawasaki et al. | 364/188 |

*Primary Examiner*—Jerry Smith
*Assistant Examiner*—Steven R. Garland
*Attorney, Agent, or Firm*—Blakely, Sokoloff, Taylor & Zafman

[57] ABSTRACT

A facility management apparatus includes a display unit for designating a facility system and selectively displaying a corresponding individual facility system screen. The individual facility system screen includes a point display section and an associated screen pull-down section. The point display section is used to designate each control monitor point in the facility system and to display detailed information of the designated point on a screen upon a pull-down operation. The associated screen pull-down section is used to designate an associated menu in the facility system and to display detailed information of the designated menu on the screen upon a pull-down operation.

11 Claims, 43 Drawing Sheets

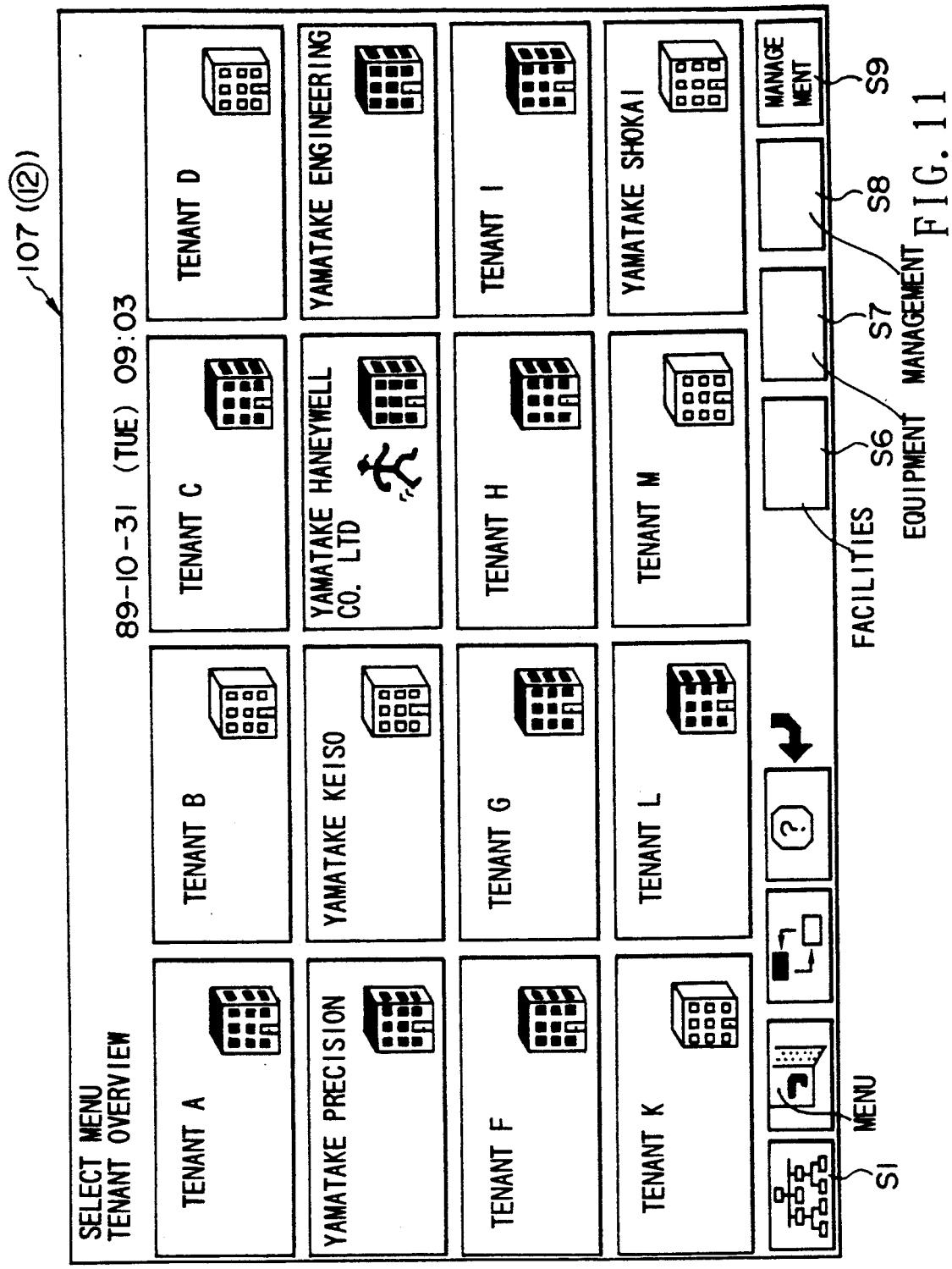

FIG. 25

| SET ITEM USER SETTING | 89-10-31 (TUE) 09:03 ③ | | | |
|---|---|---|---|---|
| ITEM | SELECTION | | | |
| OPERATION BEEP | YES | NO — INTERMIDIATE | | |
| ALARM DEEP VOLUME LEVEL | HIGH | HIGH | | |
| HELP MENU LEVEL | 1 | 2 | 3 | |
| ICON | YES | NO — FACILITIES | | |
| TOP MENU | TENANT | — EQUIPMENT | | |
| NUMBER OF PASSWORDS | 1 | 2 | 3 | 4 | 5 | 6 |

CURRENT VALE IS UPDATED UPON WRITE OPERATION

WRITE

MENU

POWER DEMAND SETTING
REGISTRATION/DELETION OF POWER
DEMAND PREDICTION 89-10-31 (TUE) 09:03

REGISTER

DEMAND CONTRACT      CONTRACT POWER 1500 Kw

TRAGET POWER 1   1500 Kw   TRAGET POWER 2   Kw

TRAGET POWER 2
EFFECTIVE PERIOD    FROM JUNE 1    TO SEPTEMBER 30

TRAGET POWER 2
EFFECTIVE TIM ZONE  FROM 13:00     TO 15:30

MENU

TREND REGISTRATION  002

1) GRAPH TITLE                89-10-31 (TUE) 09:03

2) DATA AQUISITION CYCLE      10

3) DATA AQUISITION METHOD     DESIGNATION TYPE

4) DATA AQUISITION START DATE  MON  19 H  03 W

5) GRAPH DISPLAY TIME WIDTH   20 HOURS

6) SETTING POINT 1   [AHU-0041] FOURTH FLOOR AIR CONDITIONER NO. 1

7) SETTING POINT 2   [TEMP-0041] FOURTH FLOOR AIR CONDITION AVERAGE TEMPERATURE

SI  MENU

| DESIGNATE START ADDRESS OF DISPLAY RECORD WITH DIGITS | | | | | | | | |
|---|---|---|---|---|---|---|---|---|
| MEMORY ACCESS | | | 89-10-31 (TUE) 09:03 | | | | | |
| MODULE NO | START ADDRESS 7894 | | | DISPLAY TYPE BYTE | | | DISPLAY NUMERICAL VALUE DEC | |
| | 0/8 | 1/9 | 2/A | 3/B | 4/C | 5/D | 6/E | 7/F |
| 00000/ | 89 | FF | FF | FF | FF | FF | FF | FF |
| 00008/ | FF | FF | FF | FF | FF | FF | FF | FF |
| 00010/ | FFF | FF | FF | FF | FF | FF | FF | FF |
| 00018/ | FF | FF | FF | FF | FF | FFF | FF | FF |
| 00020/ | FF | FF | FF | FF | FF | FF | FF | FF |
| 00028/ | FF | FF | FF | FF | FF | FF | FF | FF |

SET EACH ITEM
PASSWORD SETTING 89-10-31 (TUE) 09:03

(33)

| LEVEL | PASSWORD | OPERATION RANGE | USER |
|-------|----------|-----------------|------|
| 1 | 888888 | ONLY DISPLAY | TENANT |
| 2 | 7777777 | TENANT/FACIUTIES/EQUIPMENT /OPERATION | GENERAL OPERATOR |
| 3 | 4444444 | TENANT/FACILITIES/EQUIPMENT /MANAGEMENT OPERATION | PERSON IN CHARGE OF MANAGEMENT |
| 4 | 2222222 | TENANT/FACILITIES/EQUIPMENT /MANAGEMENT/MAINTENANCE OPERATION | PERSON IN CHARGE OF INSTRUMENTATIR FACILITIES |
| 5 | 456930 | ALMIGHTY | SUPER USER |

PASSWORD 0 INDICATES NO SETTING

S1    MENU

FIG. 37

FACILITY MANAGEMENT APPARATUS HAVING TOUCH RESPONSIVE DISPLAY SCREENS

BACKGROUND OF THE INVENTION

The present invention relates to a facility management apparatus for displaying detailed information on a screen and managing various types of facilities.

In a multistory building, a housing complex, a hospital, a factory, and the like, various types of facilities are arranged, e.g., air conditioning facilities, electric power facilities, crime preventing facilities, fire preventing facilities, and heat source facilities. These facility systems include a large number of various types of devices as equipment.

According to a conventional apparatus, the respective items in such facilities are managed as follows. First, the following lists are independently displayed on a screen: a point list indicating a control monitor point (point) in a given facility system; an associated graph list including various types of graphs indicating histories in the facility system; and an associated control program list including various types of programs enabling set control operations in the facility system. A desired point, a desired associated graph menu, and a desired associated control program menu are then selected from the displayed lists to be designated, thus displaying detailed information thereof on the screen upon a pull-down operation.

In such a conventional facility management method, however, detailed information of a desired point, a desired associated graph menu, and a desired associated graph menu cannot be displayed on the screen upon a pull-down operation unless the point list, the associated graph list, and the associated control program list are selected and displayed on the screen one by one. This undesirably increases the number of operator actions.

In addition, since the point list, the associated graph list, and the associated control program list, which are displayed on the screen, are formed as lists common to all the facility systems, each displayed list includes unnecessary information for different operators in the respective facility systems. For this reason, a cumbersome operation is required to select a desired point or menu from a displayed list, further burdening each operator.

SUMMARY OF THE INVENTION

In is an object of the present invention to provide a facility management apparatus which can display a desired control monitor point or an associated menu upon a pull-down operation with a small number of operator actions.

It is another object of the present invention to provide a facility management apparatus which can display only information necessary for the respective operators of various types of facility systems to reduce loads on the operators.

In order to achieve the above objects, according to the present invention, there is provided a facility management apparatus comprising display means for designating a facility system and selectively displaying a corresponding individual facility system screen, the individual facility system screen including a point display section for designating each control monitor point in the facility system and displaying detailed information of the designated point on a screen upon a pull-down operation, and an associated screen pull-down section for designating an associated menu in the facility system and displaying detailed information of the designated menu on the screen upon a pull-down operation.

BRIEF DESCRIPTION OF THE DRAWINGS

FIG. 11 is a view showing a tenant overview screen;

FIGS. 15 to 37 are views showing screens to be displayed upon pull-down operations by selectively touching constituent tags of the hierarchy screen.

DESCRIPTION OF THE PREFERRED EMBODIMENT

A facility management apparatus according to the present invention will be described in detail below.

Figure 2:
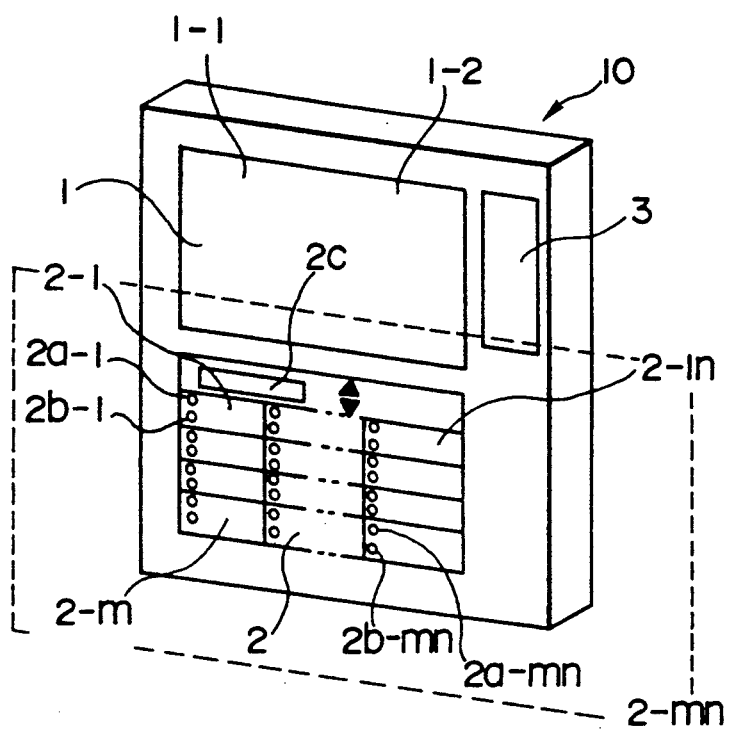
FIG. 2 is a perspective view showing an outer appearance of the savic apparatus as an embodiment of a facility management apparatus according to the present invention.

FIG. 2 shows an integral building automation system (to be referred to as a savic apparatus hereinafter) as an embodiment of the facility management apparatus.

This savic apparatus is designed to collectively manage air conditioning facilities, power facilities, crime preventing facilities, fire preventing facilities, heat source facilities, water-supply and plumbing facilities, sanitary facilities, and the like in small- and medium-sized buildings, and is used in general offices, tenant buildings, factories, hospitals, and other facilities to realize energy saving and labor saving and to perform safety management and operation management.

In this embodiment, the savic apparatus has functions necessary for management of small- and medium-sized tenant buildings. In addition, the apparatus includes a user-friendly man-machine interface to allow anyone to easily operate it in consideration of the fact that no special operators are employed in small- and medium-sized buildings. Furthermore, the apparatus has a space-saving, low-profile structure designed for wall mounting in consideration of the fact that a special management room is not generally ensured.

Referring to FIG. 2, reference numeral 1 denotes an LCD with a touch panel; 2, an annunciator; and 3, a built-in printer.

Figure 3:
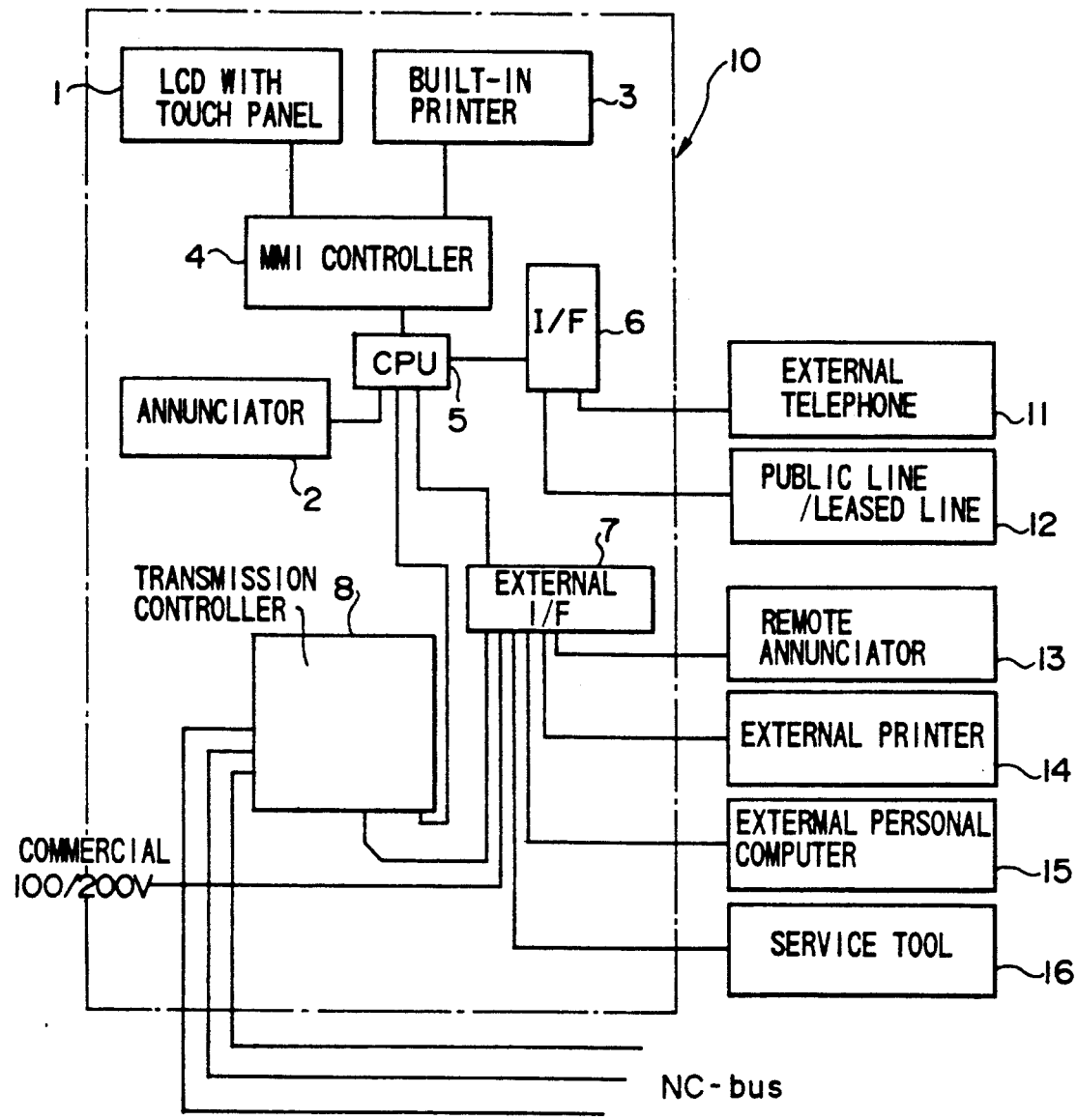
FIG. 3 is a block diagram showing the savic apparatus.

FIG. 3 is a block diagram of a savic apparatus 10. The LCD 1 with the touch panel and the built-in printer 3 are connected to a CPU 5 through an MMI controller 4.

An external telephone 11 and a public line/leased line 12 are connected to the CPU 5 through an interface 6. A remote annunciator 13, an external printer 14, an external personal computer 15, and a service tool 16 are connected to the CPU 7 through an external interface 7. Note that reference numeral 8 denotes a transmission controller which allows data transmission between a transmission system NC-bus and the CPU 5.

The LCD 1 with the touch panel 1 is designed such that a touch panel 1-2 is attached to the entire screen of a LCD 1-1 with a backlight. With this arrangement, an input operation can be performed by directly touching the panel surface with a finger in accordance with a display on the screen. The annunciator 2 has red LEDs $2a_{-1}$ to $2a_{-nm}$ and green LEDs $2b_{-1}$ to $2b_{-mn}$ which respectively emit light in partitions $2_{-1}$ to $2_{-mn}$ to display the states of the respective points (control monitor points). Point names are respectively written in the partitions $2_{-1}$ to $2_{-mn}$. In addition, touch sensors are arranged in the partitions $2_{-1}$ to $2_{-mn}$ in which the point names are written. When a given touch sensor is turned on, i.e., a given one of the partitions $2_{-1}$ to $2_{-mn}$ is touched, analog information associated with the point name written in the touched partition is displayed on a display portion 2c constituted by a seven segments. A strip chart printer is used as the built-in printer 3, which can print an alarm record and an operation record in kanji sets (JIS level-1 and level-2 kanji sets).

Figure 4:
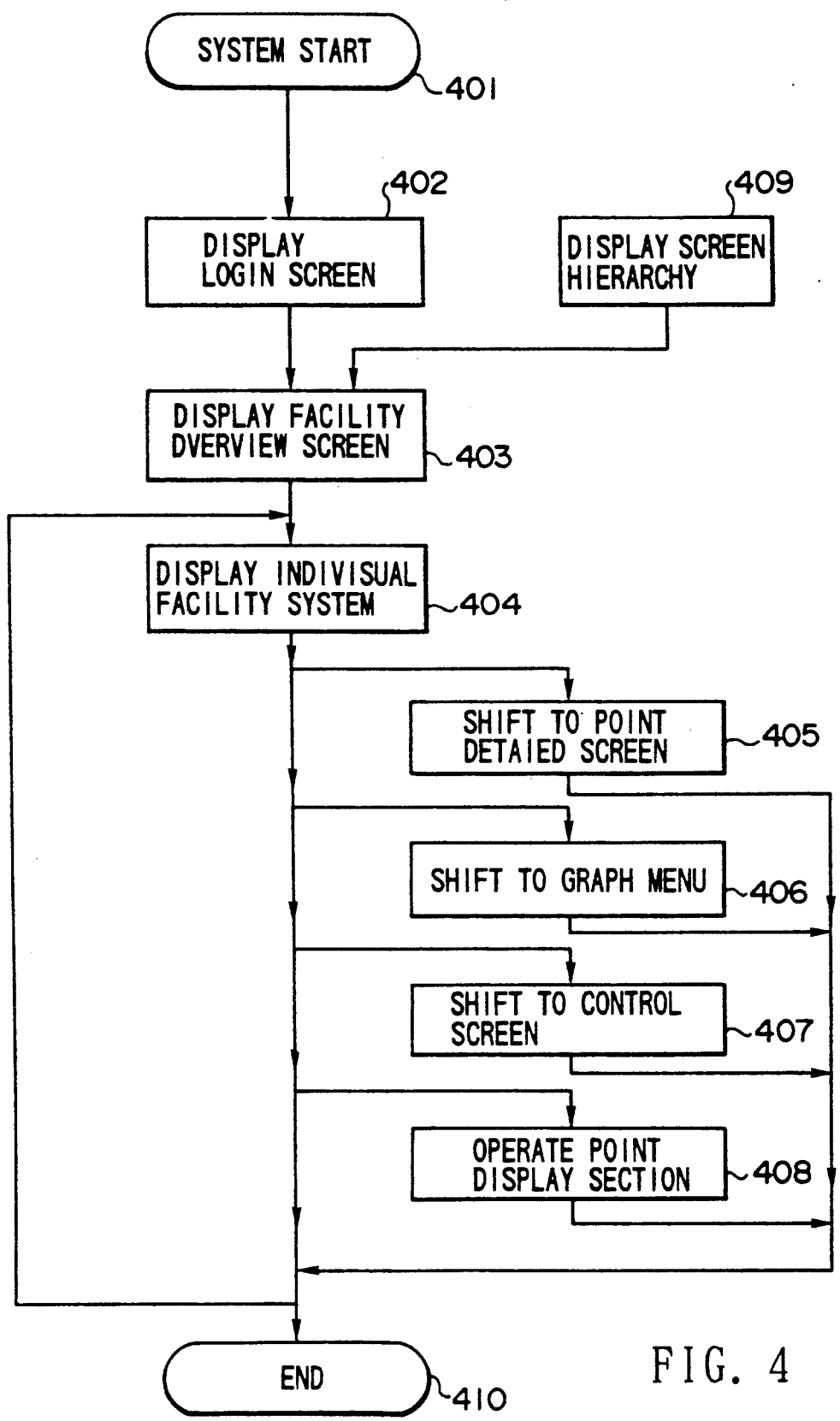
FIG. 4 is a flow chart for explaining an outline of a characteristic operation of the savic apparatus.

An outline of a characteristic operation of the savic apparatus 10 having the above-described arrangement will be described below with reference to a flow chart shown in FIG. 4.

Figure 5:
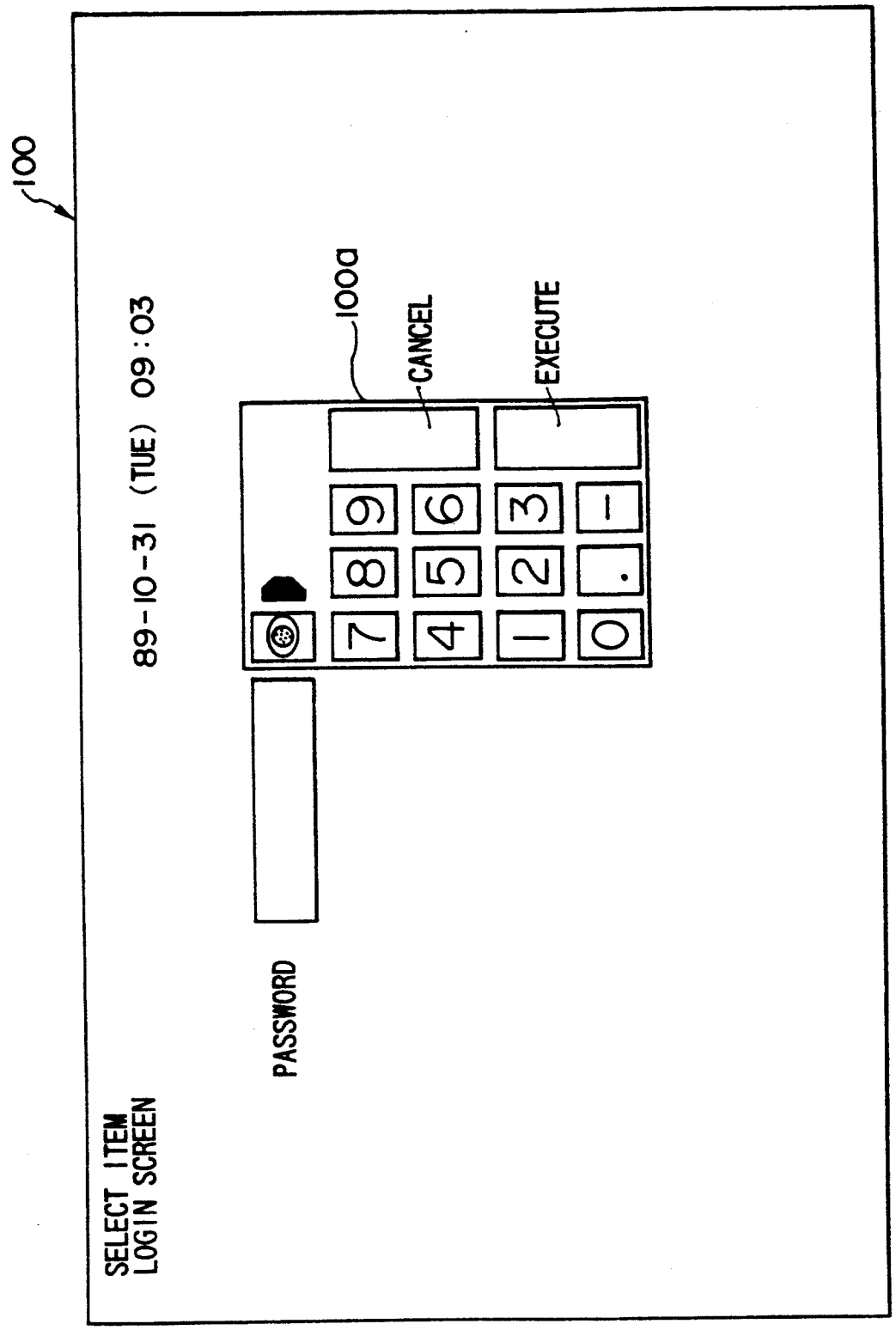
FIG. 5 is a view showing a login screen displayed on the LCD with the touch panel of the savic apparatus.
Figure 7:
FIG. 7 is a view showing a one-point information screen.
Figure 8:
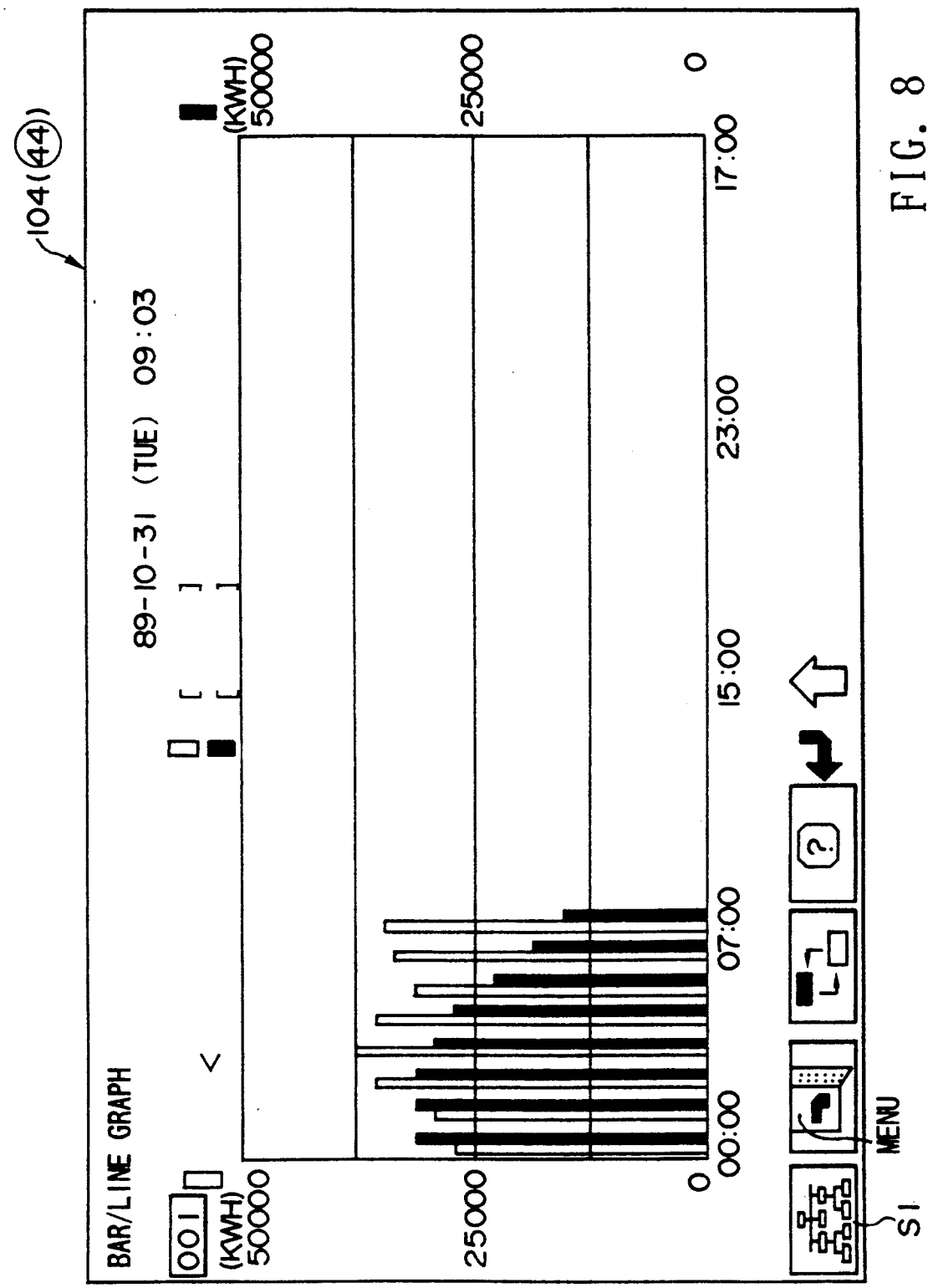
FIG. 8 is a view showing a bar/line graph screen.
Figure 9:
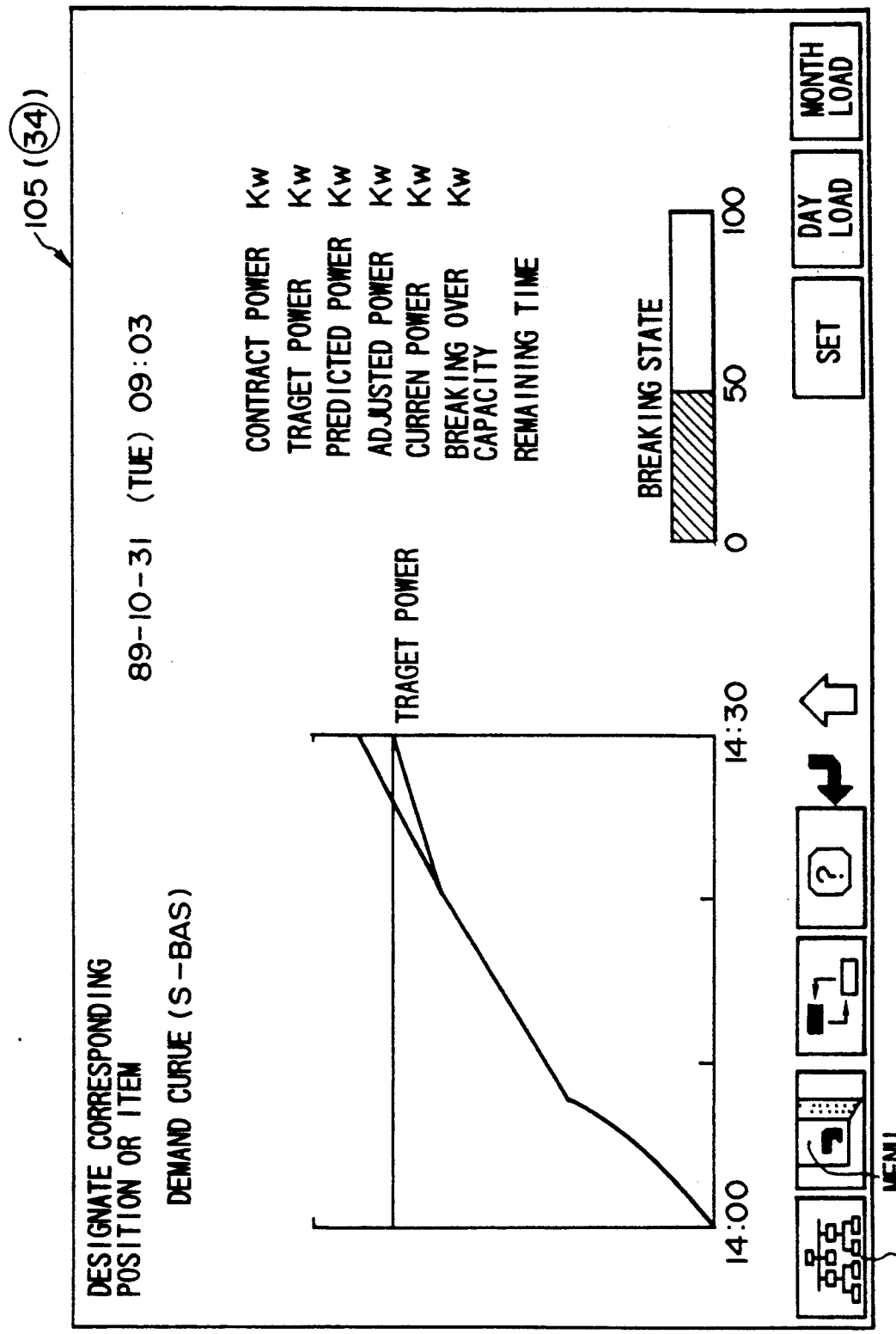
FIG. 9 is a view showing a demand curve screen.
Figure 10A:
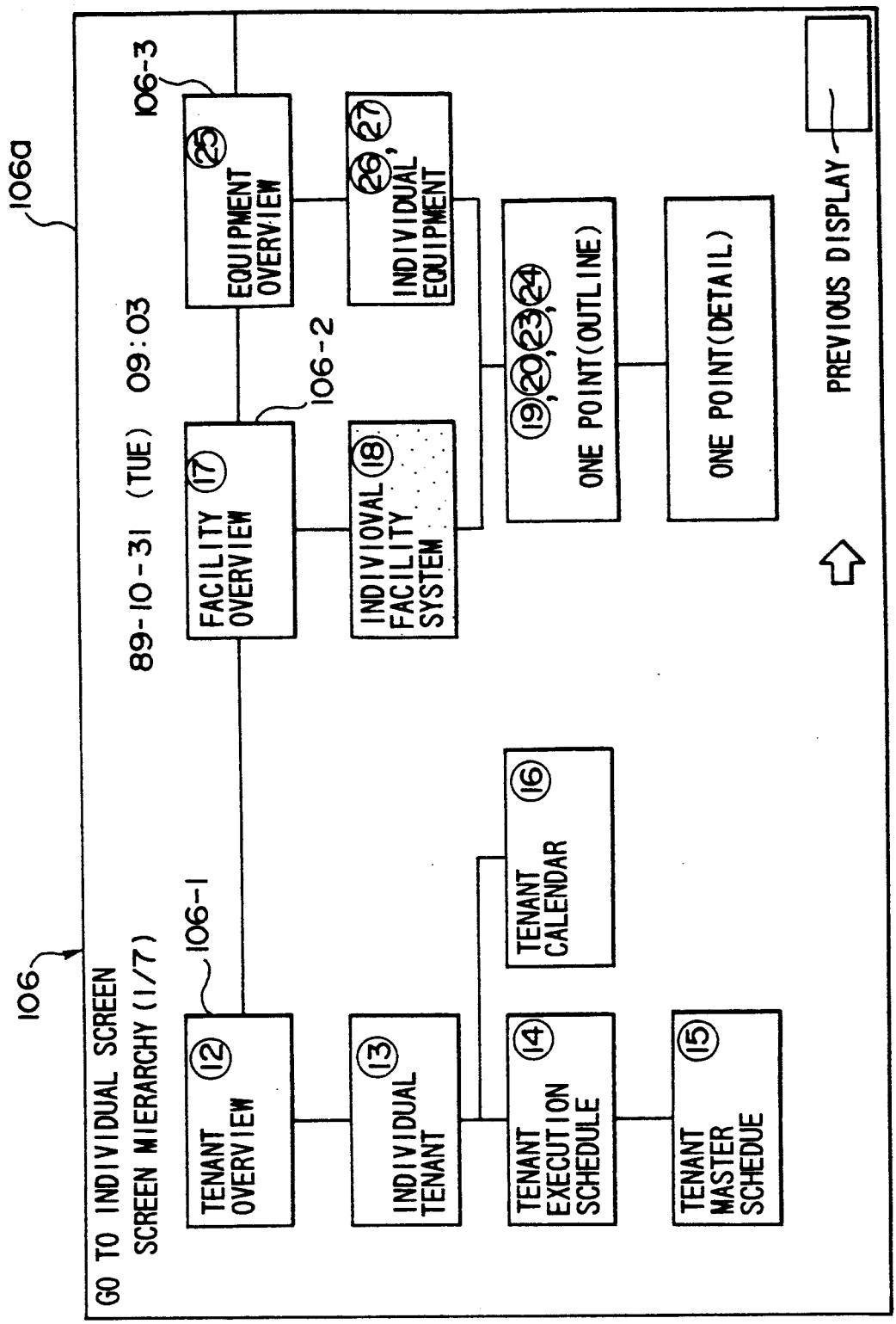
FIGS. 10(A) to 10(G) are views showing a hierarchy screen.
Figure 10B:
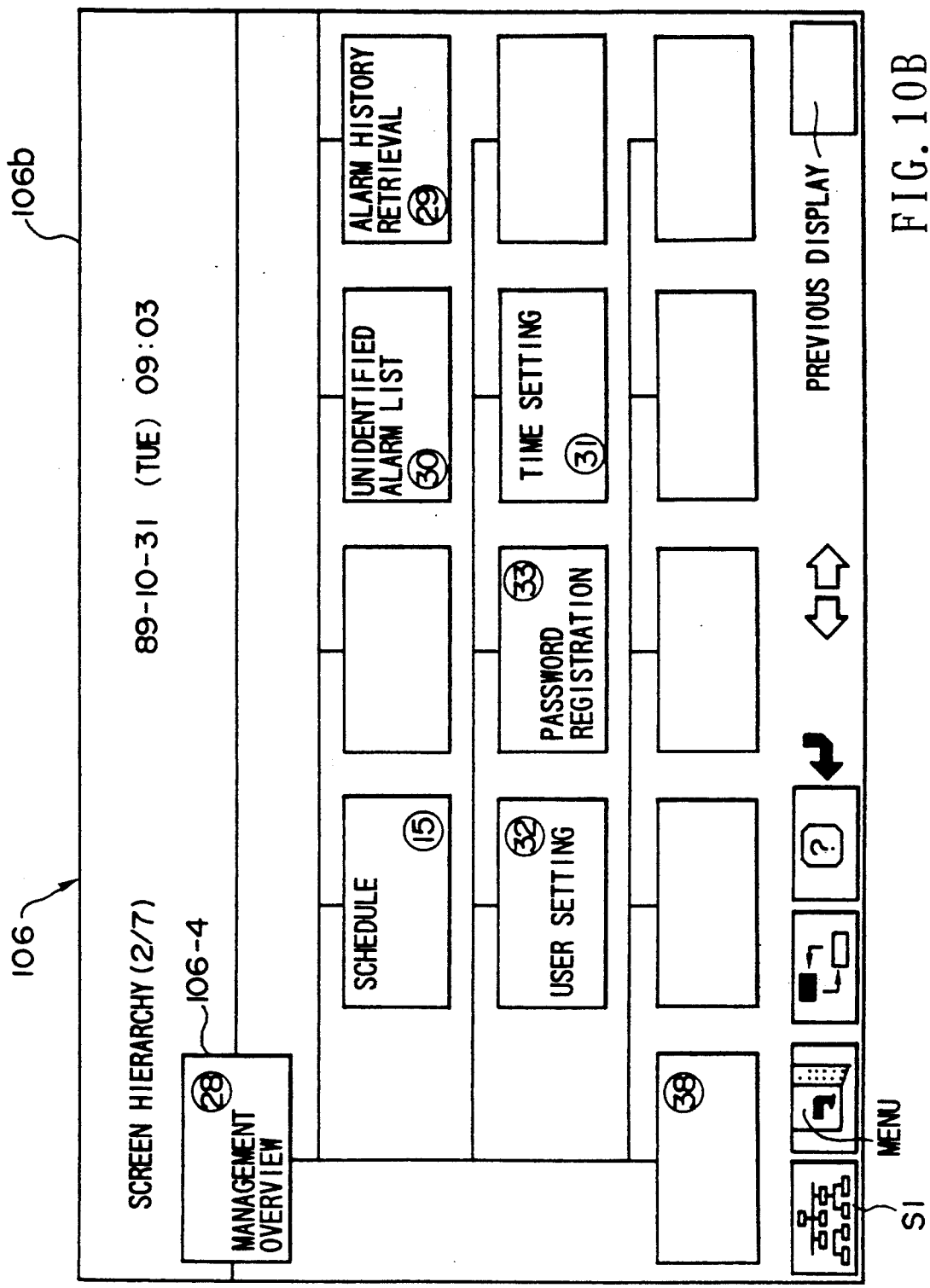
Figure 10C:
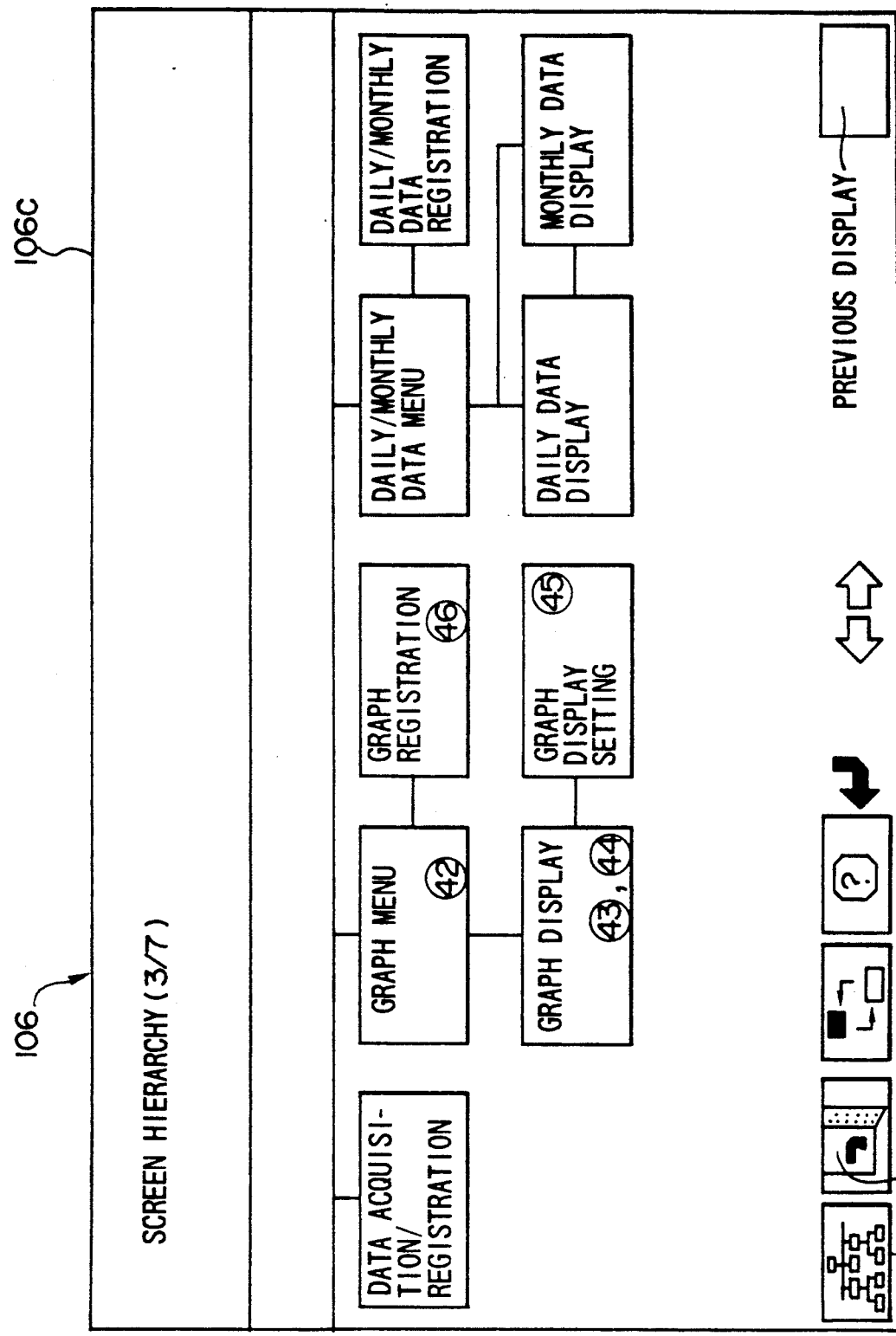
Figure 10D:
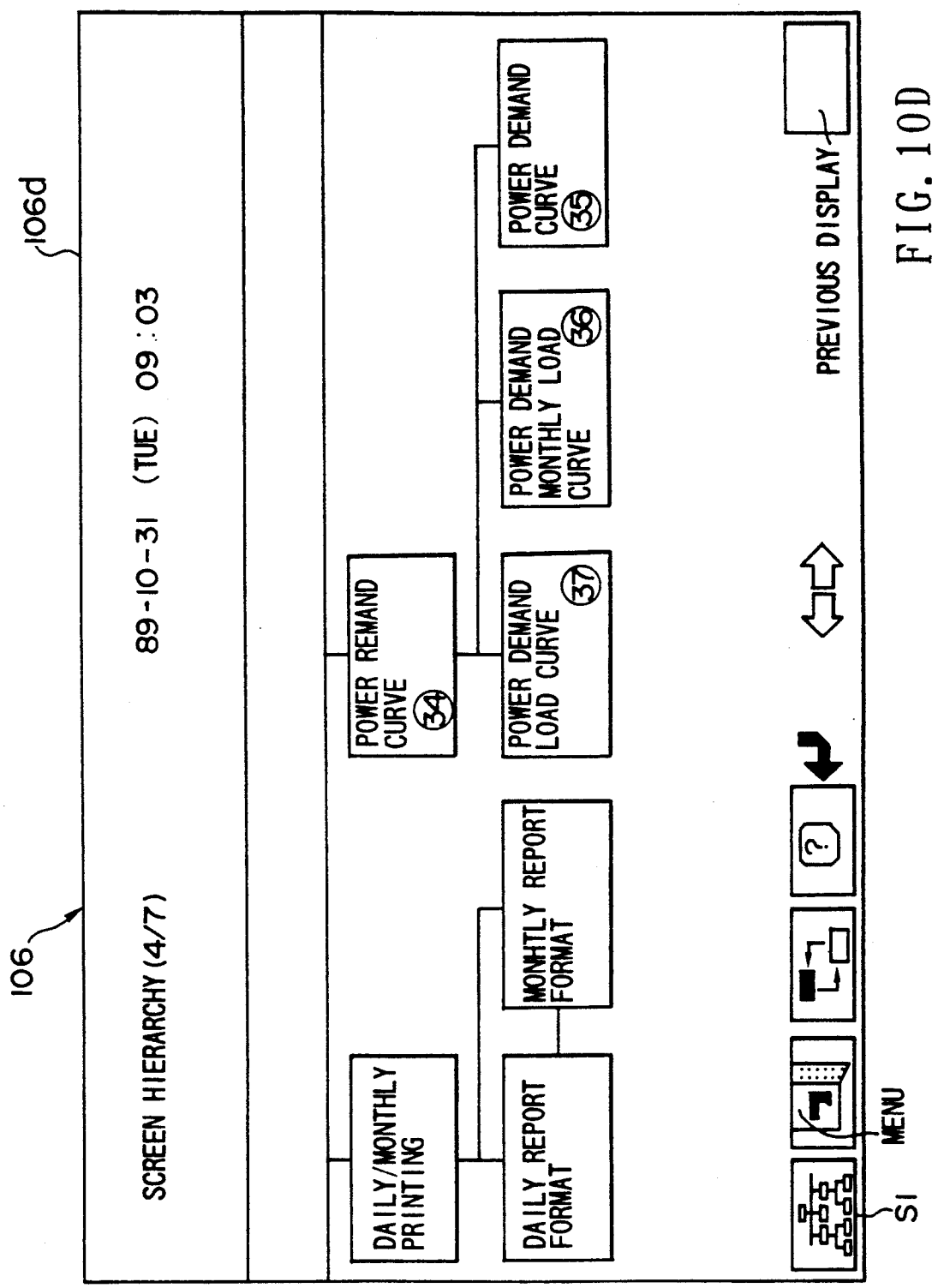
Figure 10E:
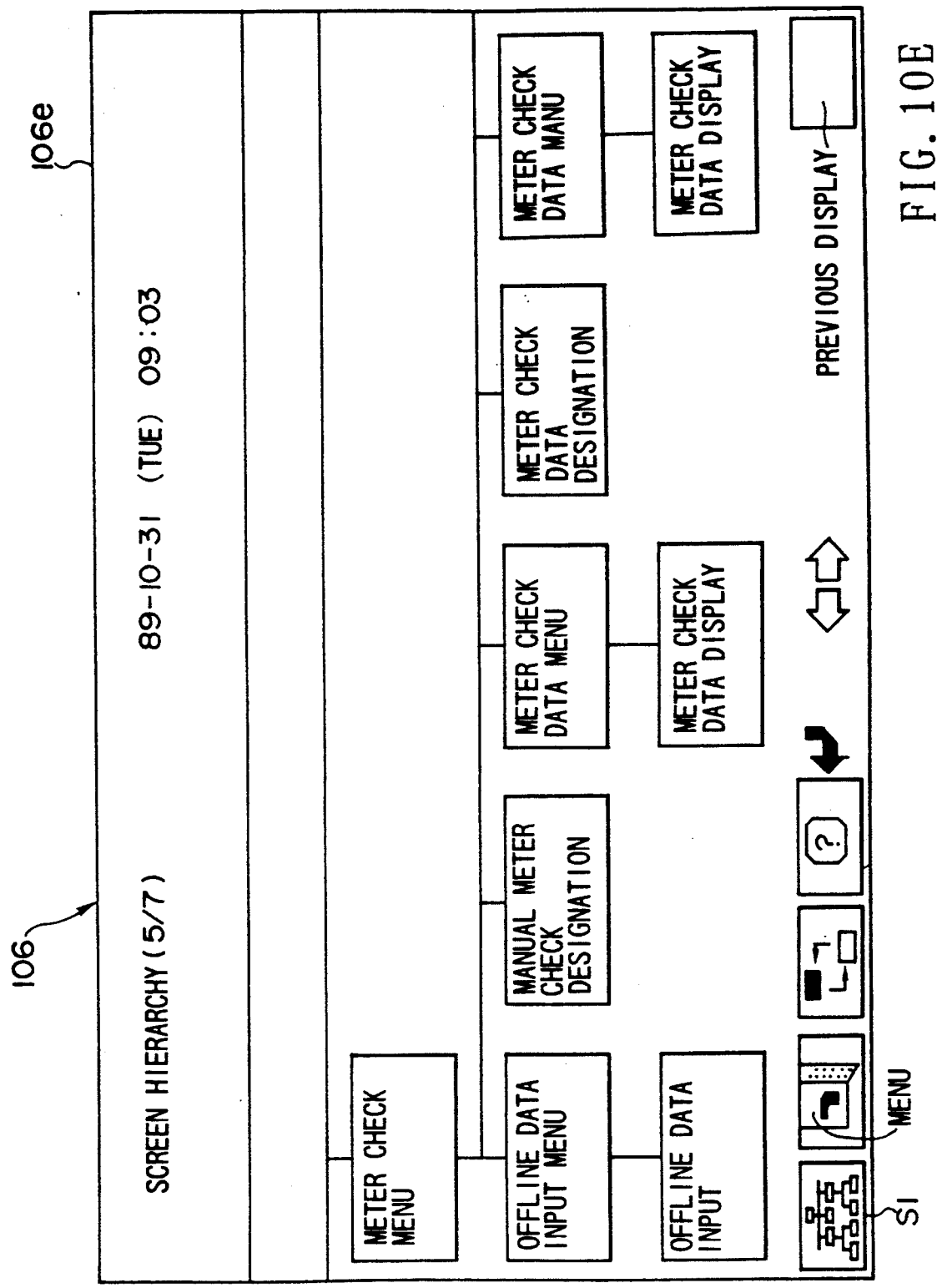
Figure 10F:
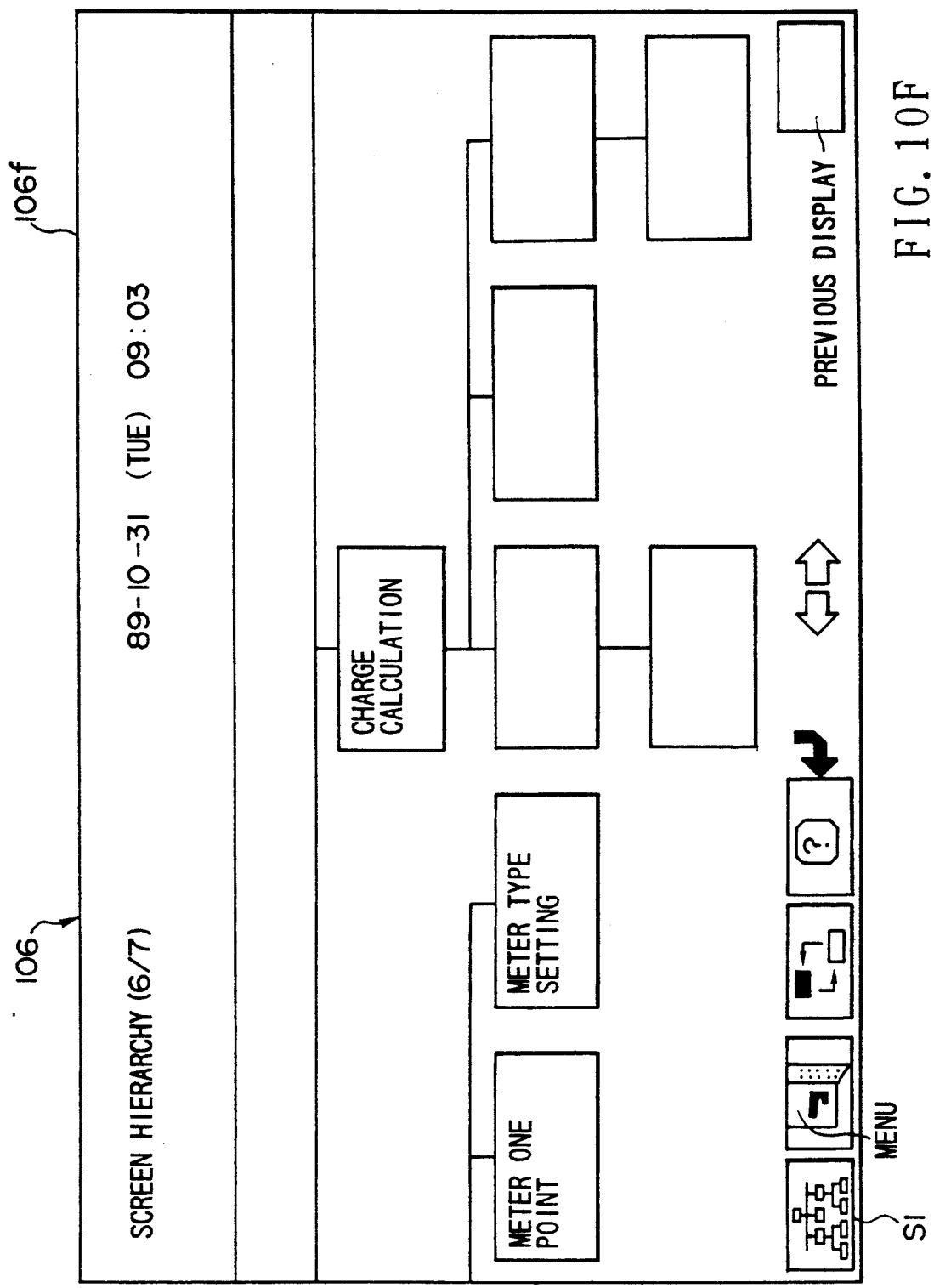
Figure 10G:
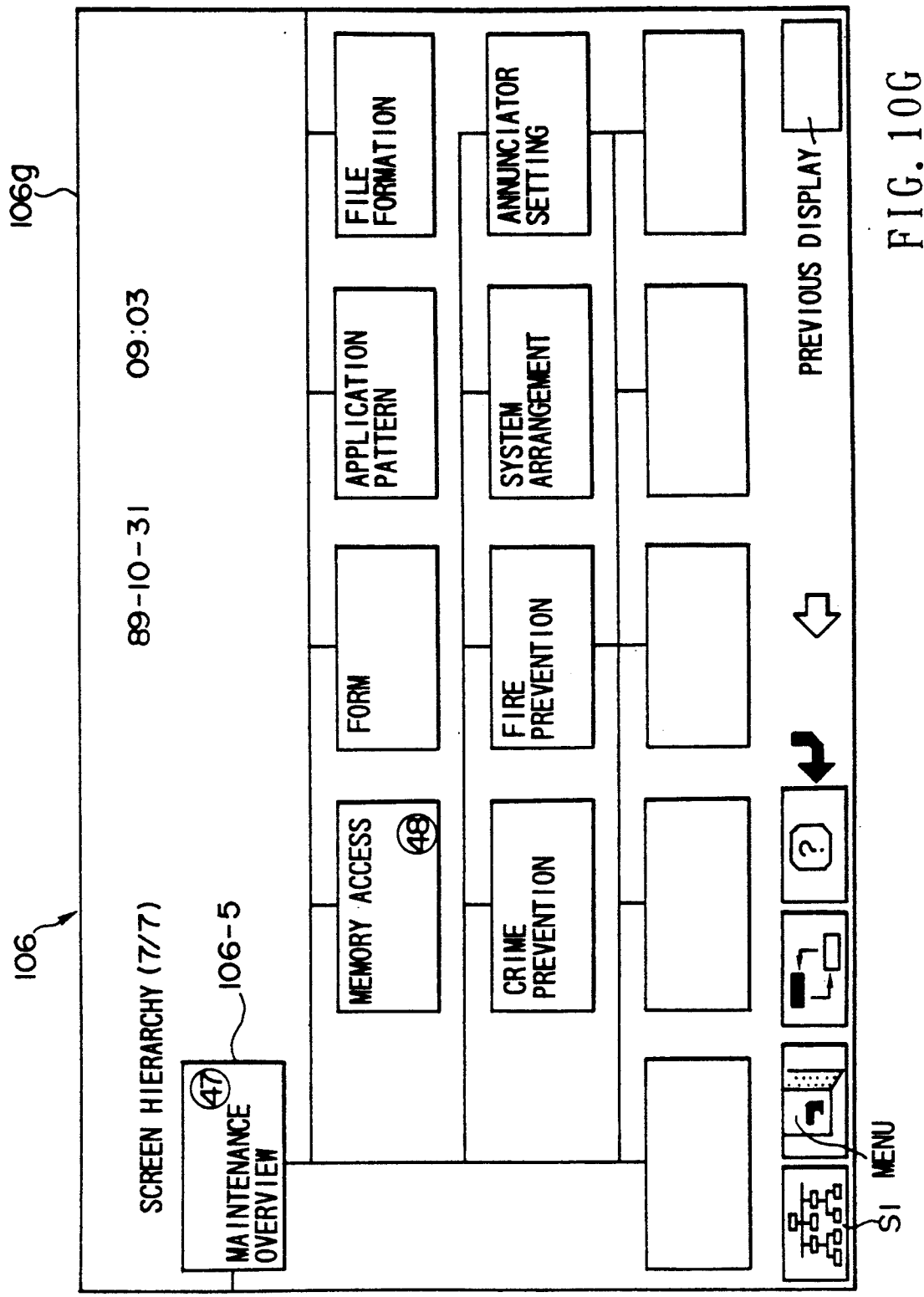
Figure 12:
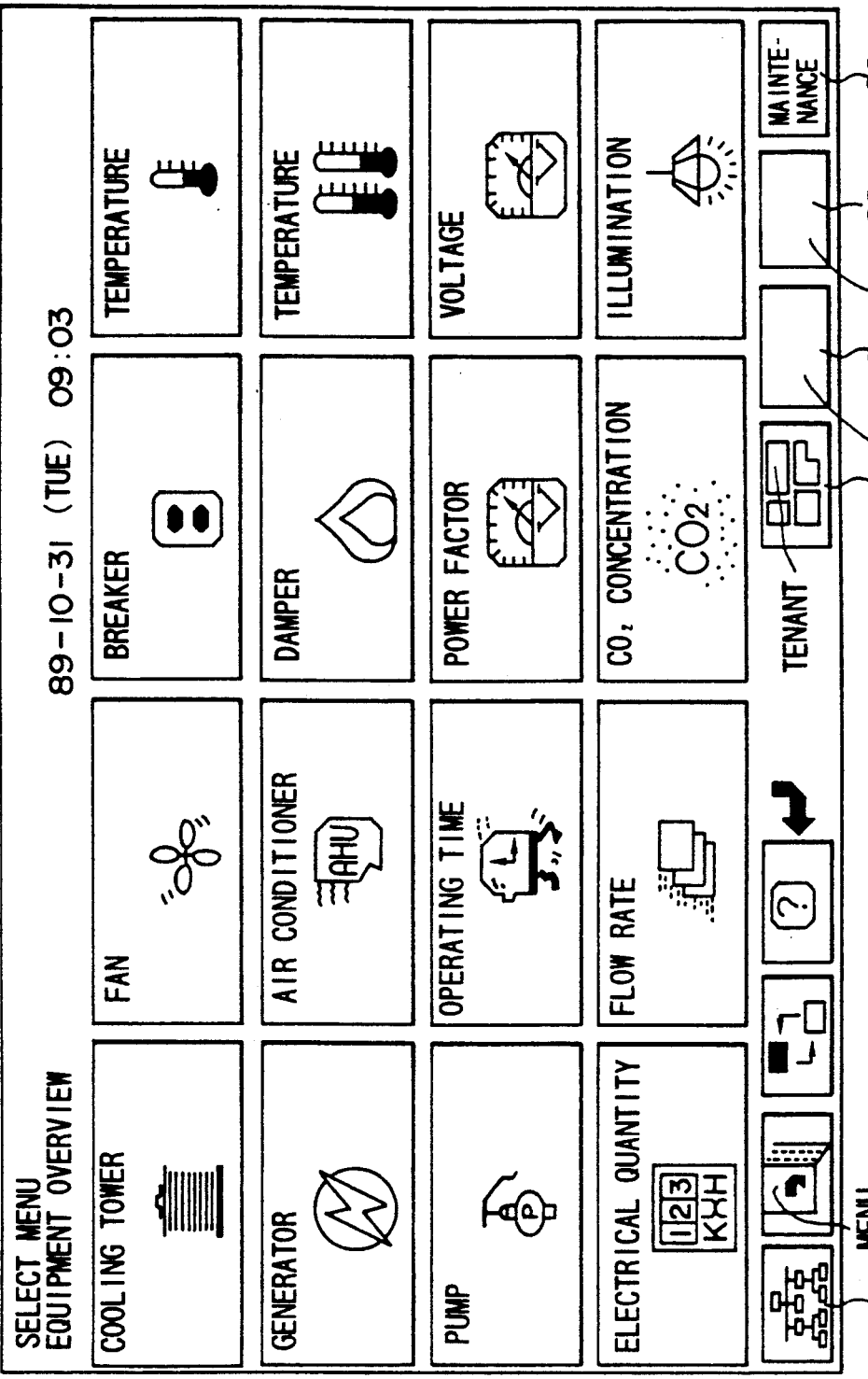
FIG. 12 is a view showing an equipment overview screen.
Figure 13:
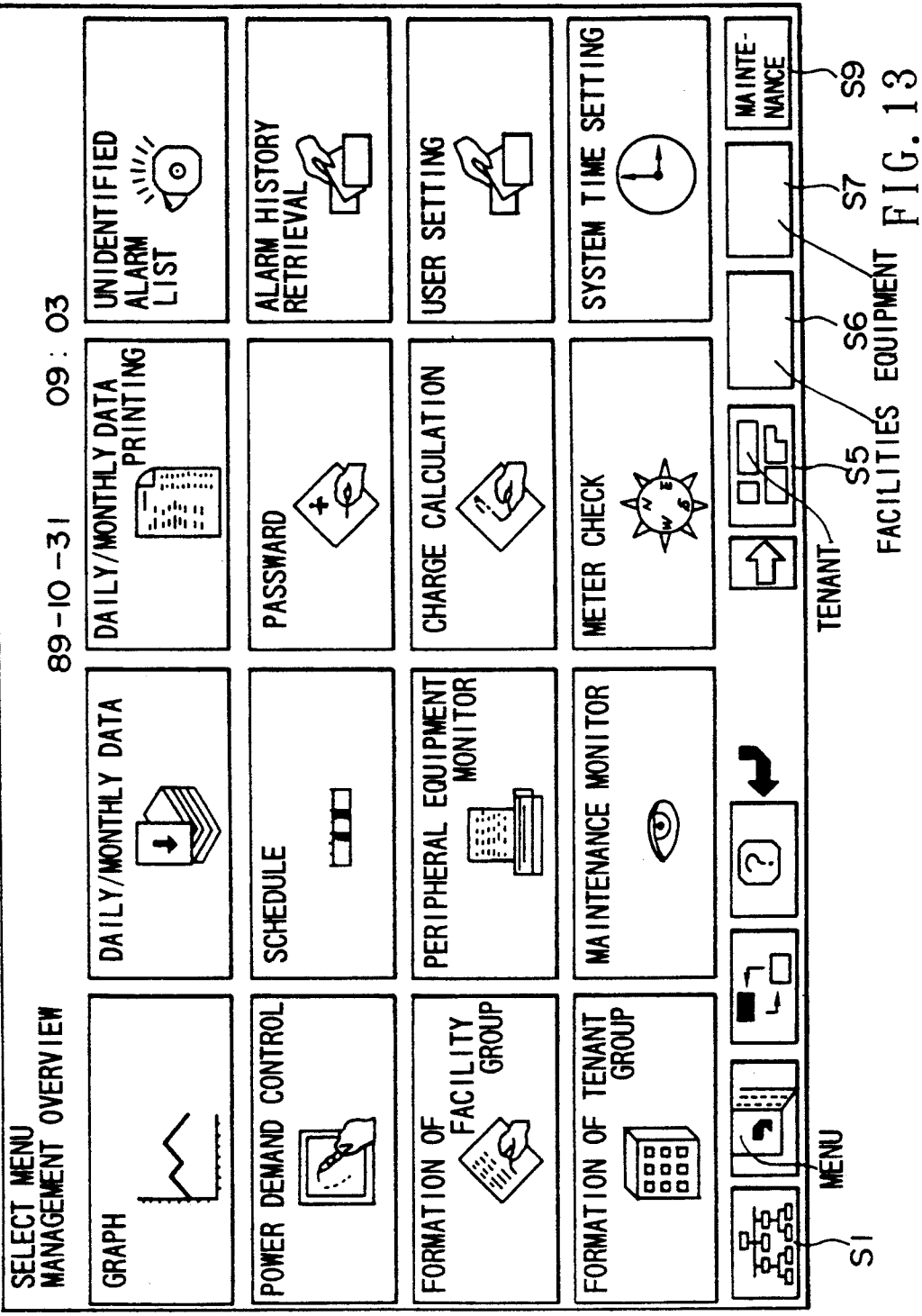
FIG. 13 is a view showing a management overview screen.
Figure 14:
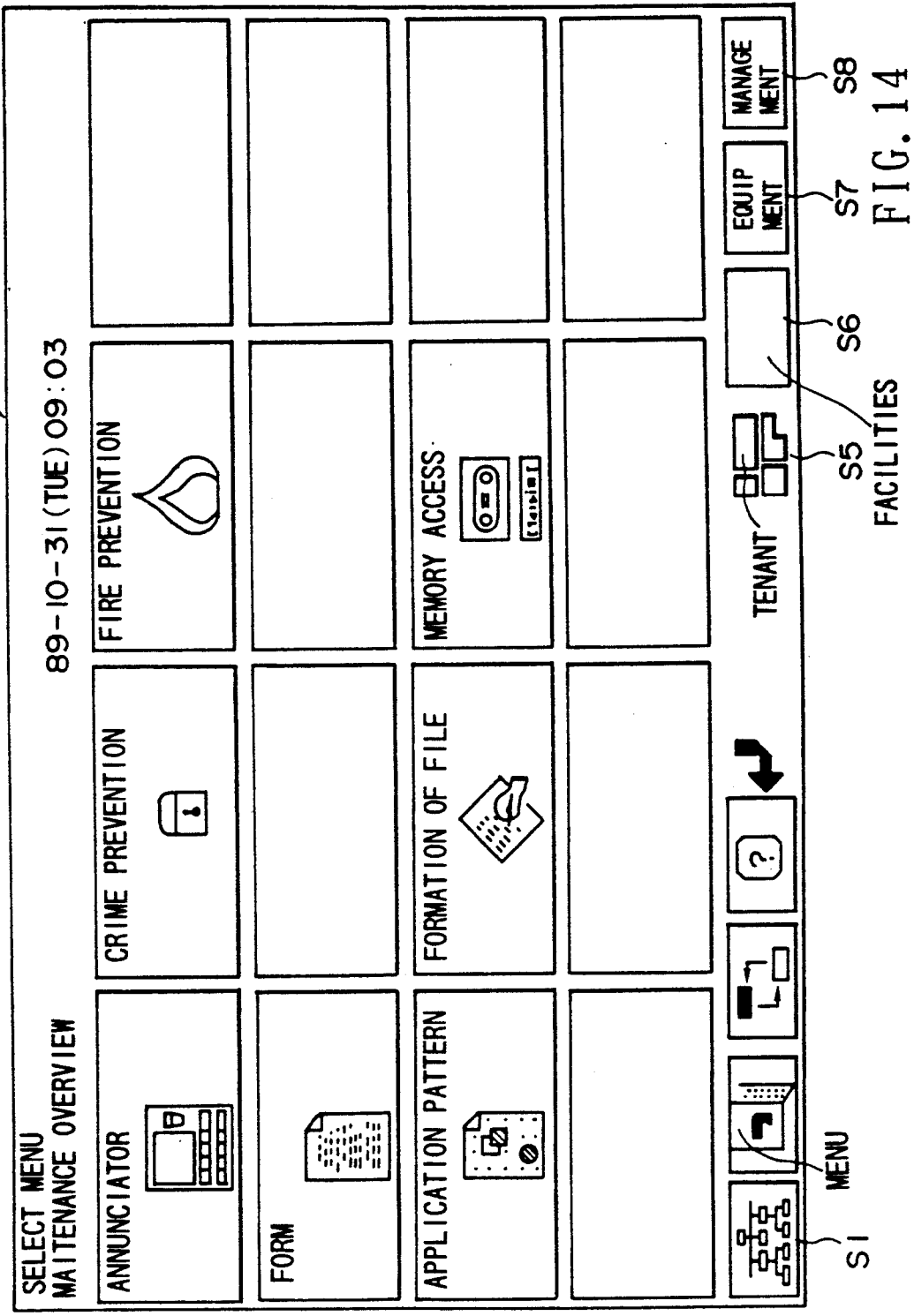
FIG. 14 is a maintenance overview screen.
Figure 15:
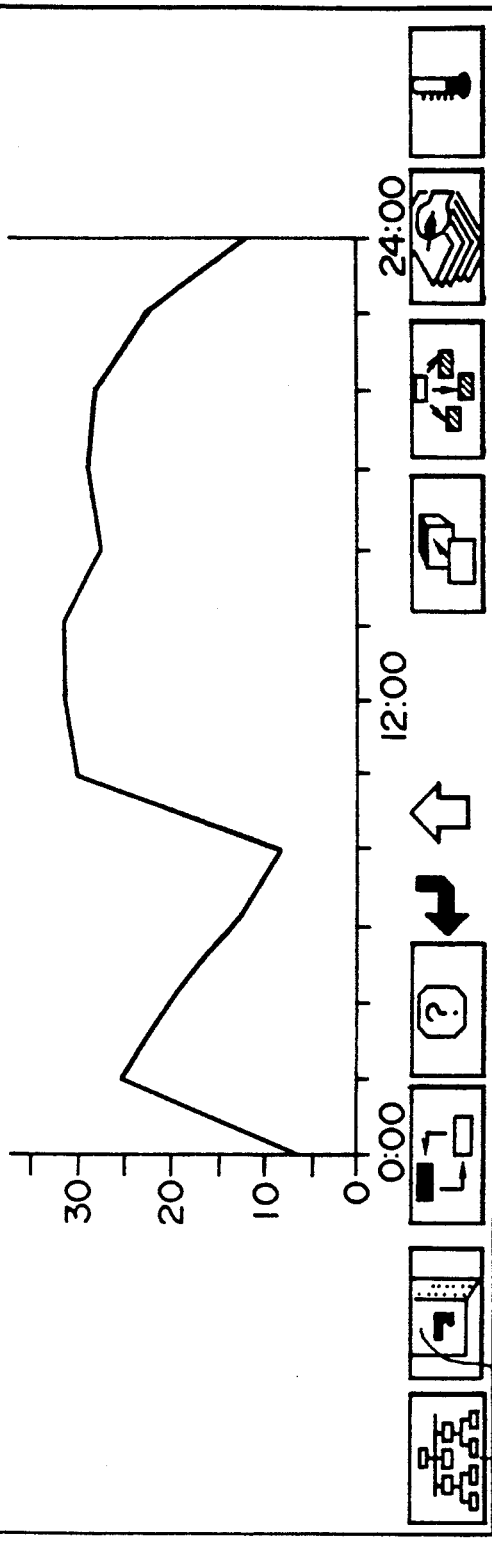
Figure 16:
Figure 17:
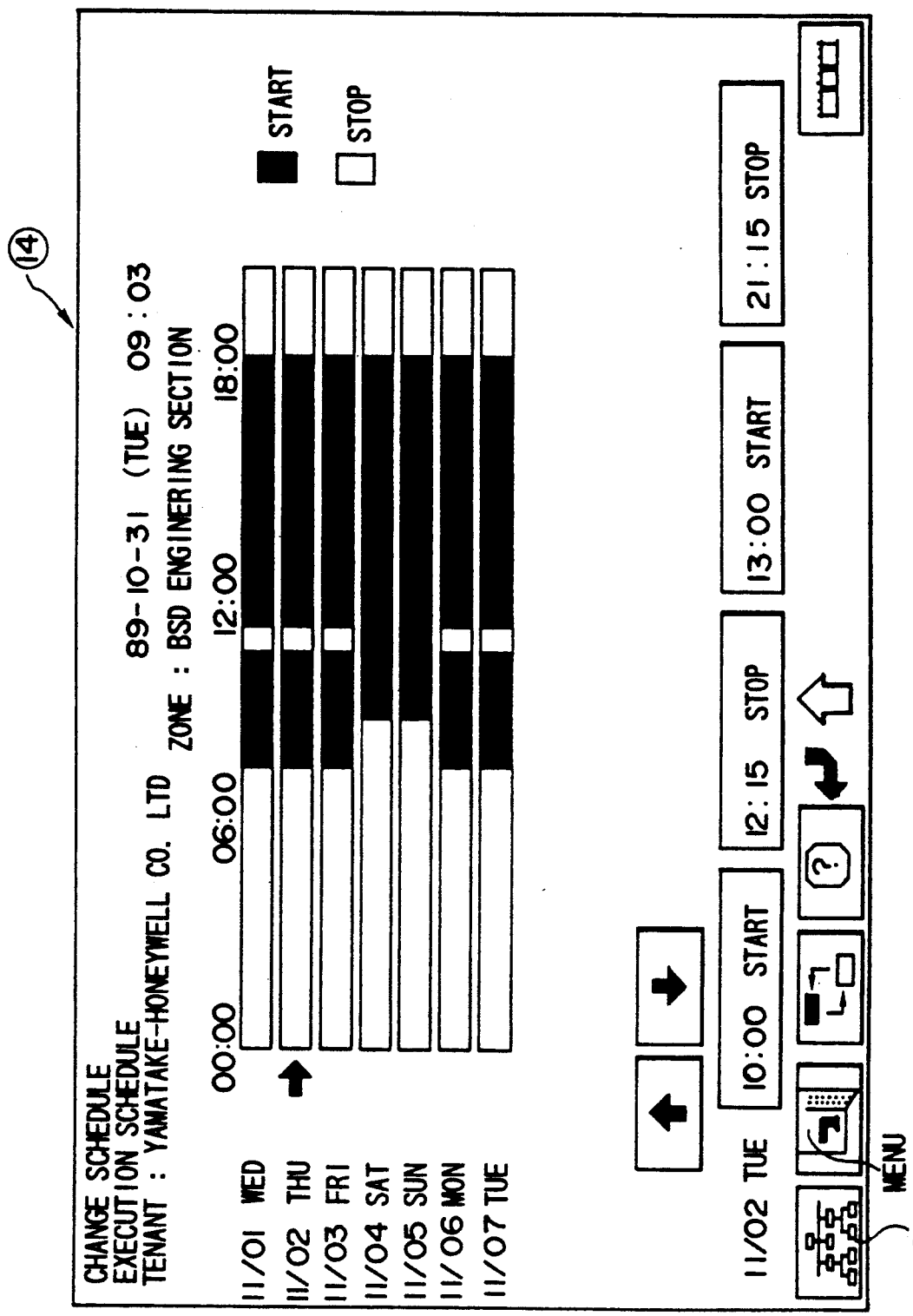
Figure 18:
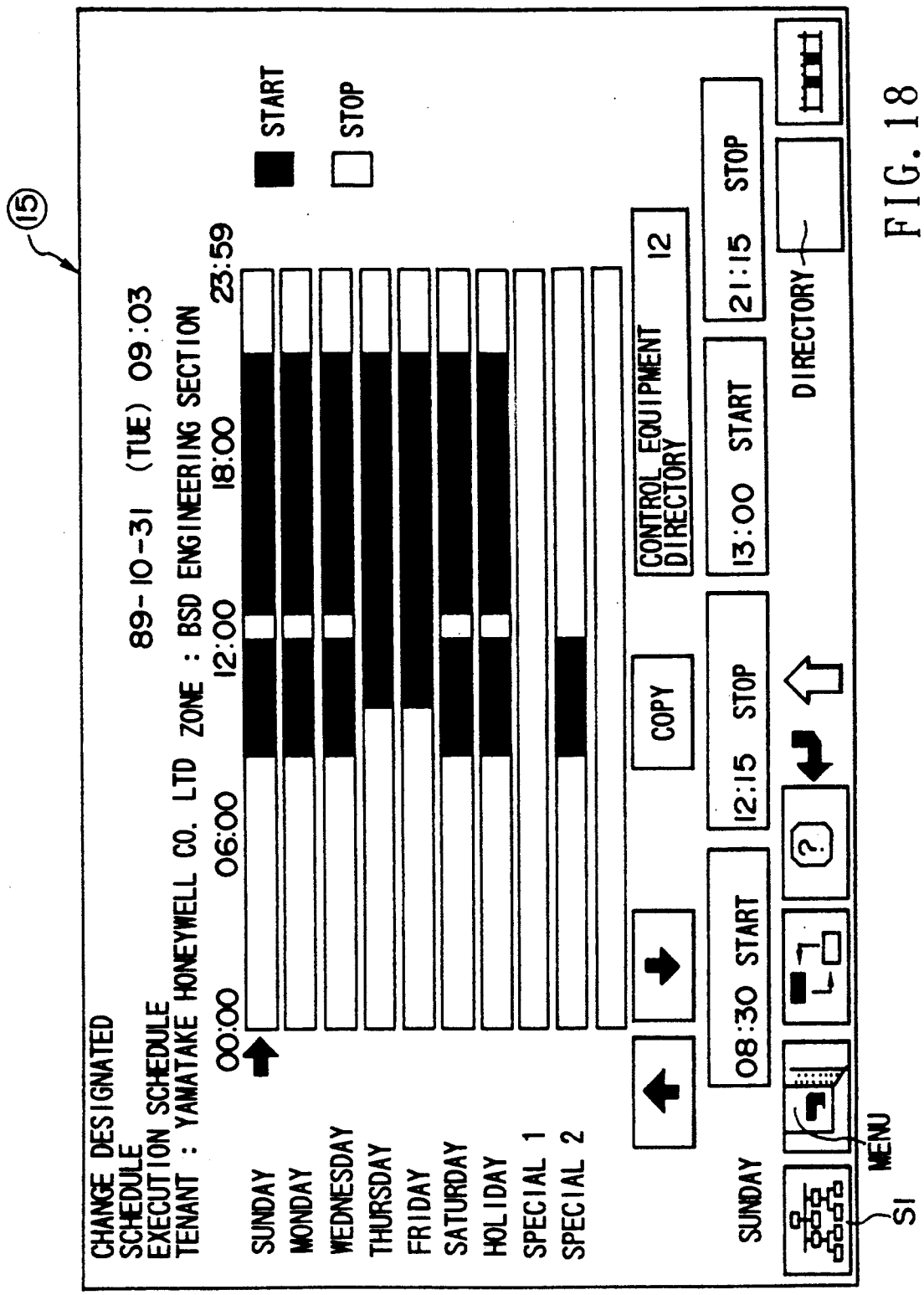
Figure 19:
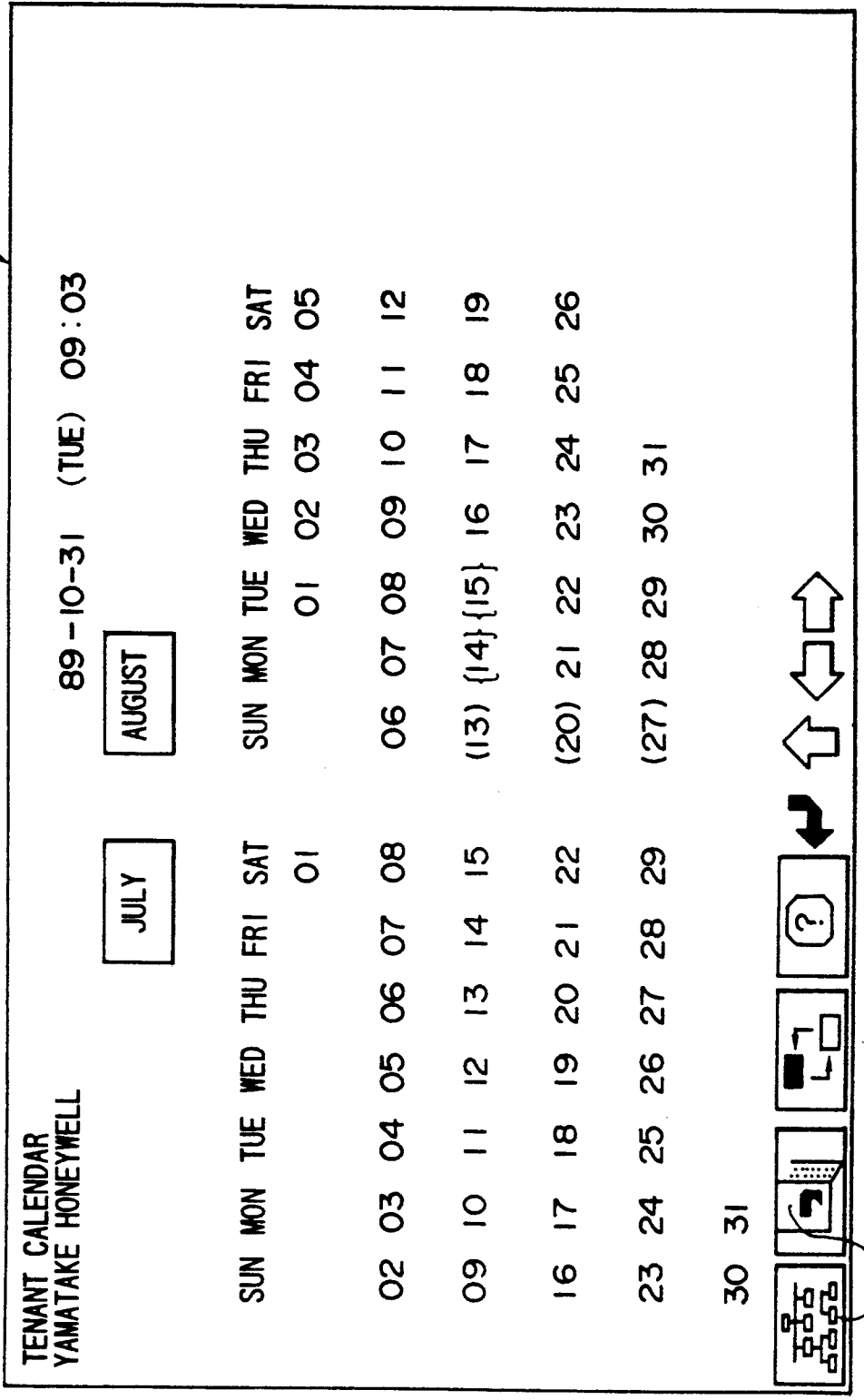
Figure 20:
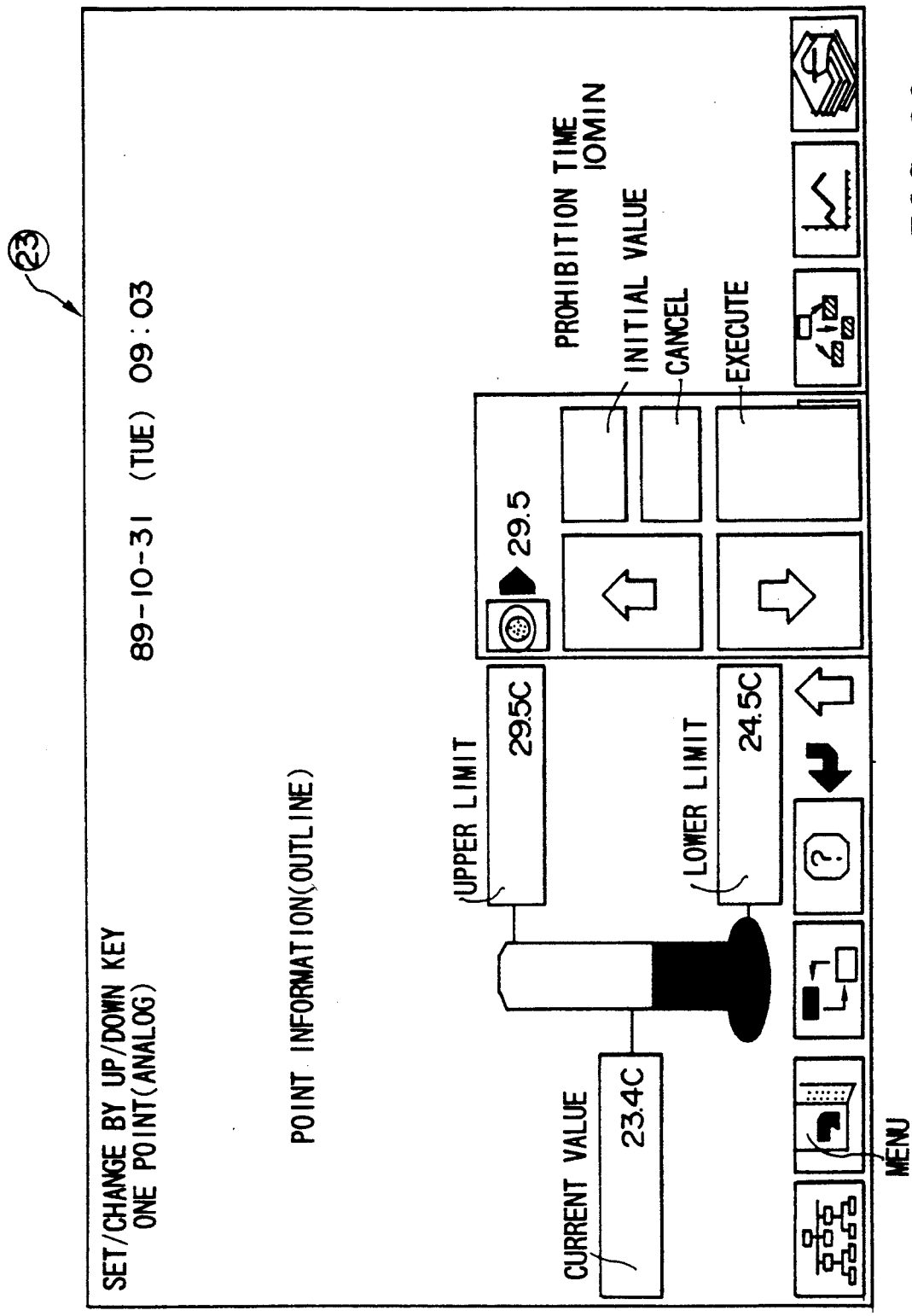
Figure 21:
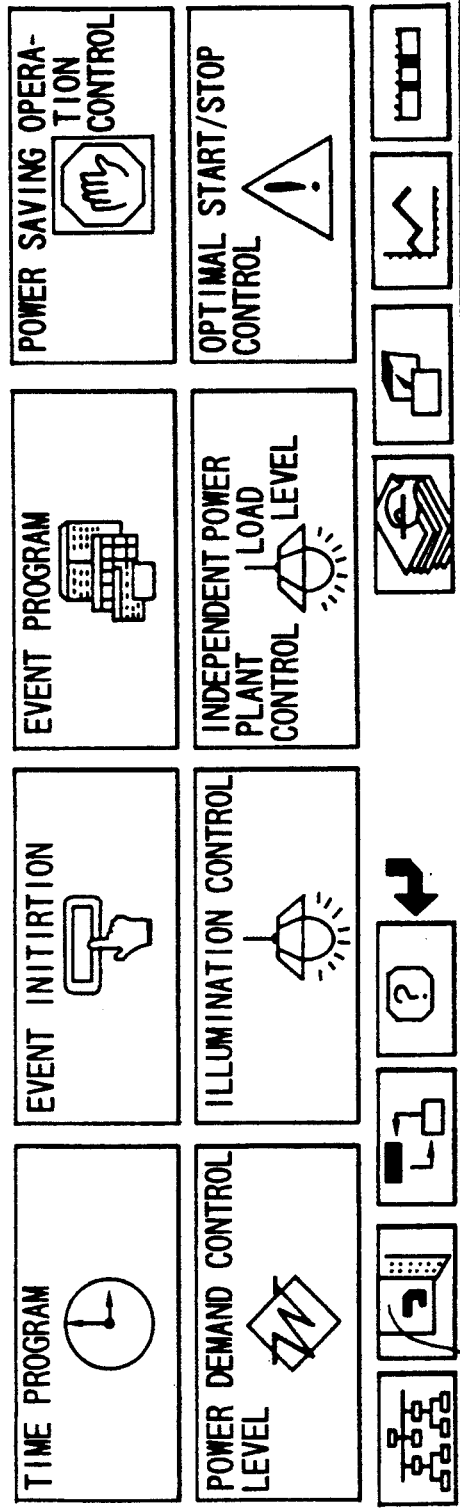
Figure 22:
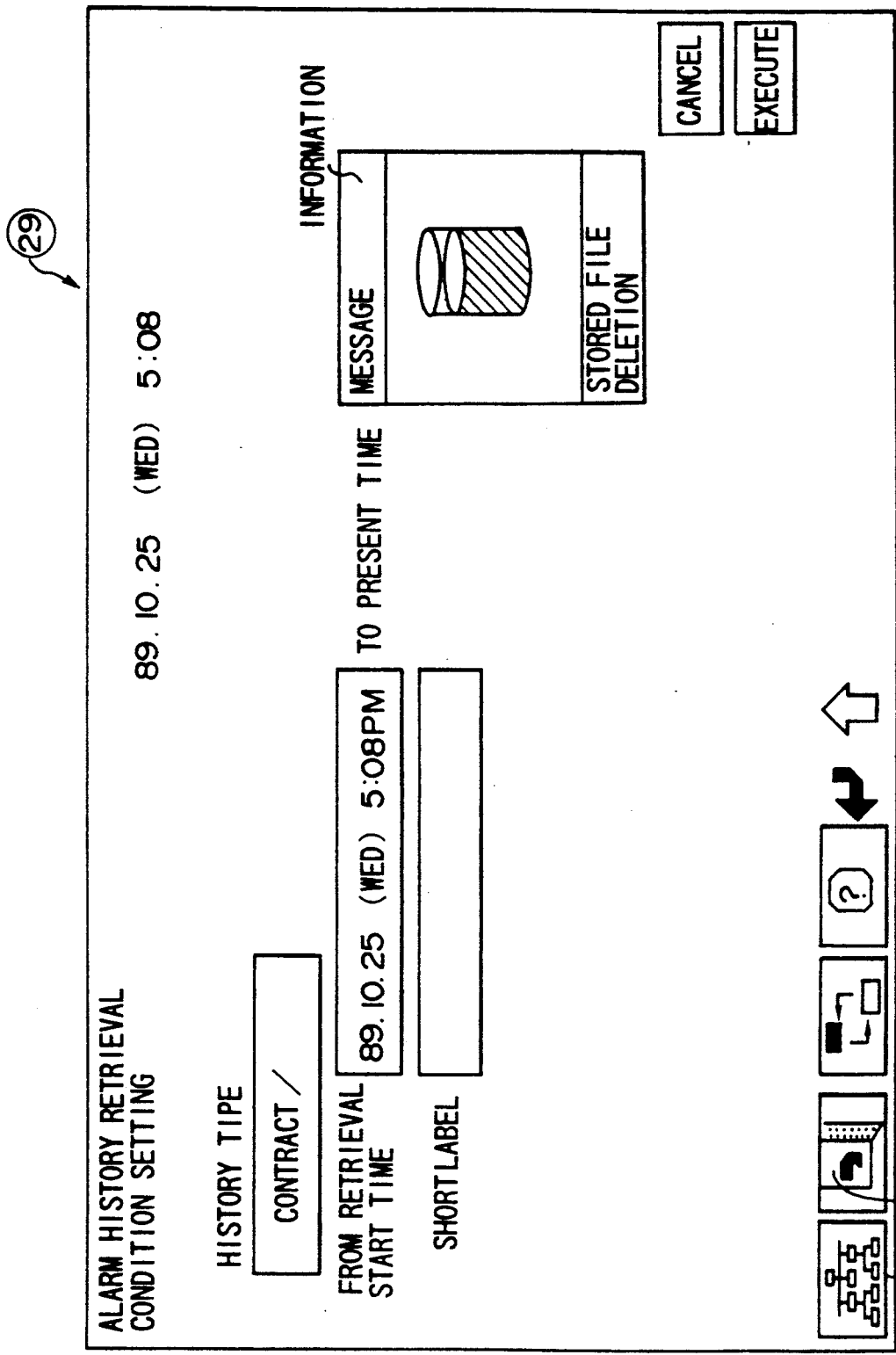
Figure 23:
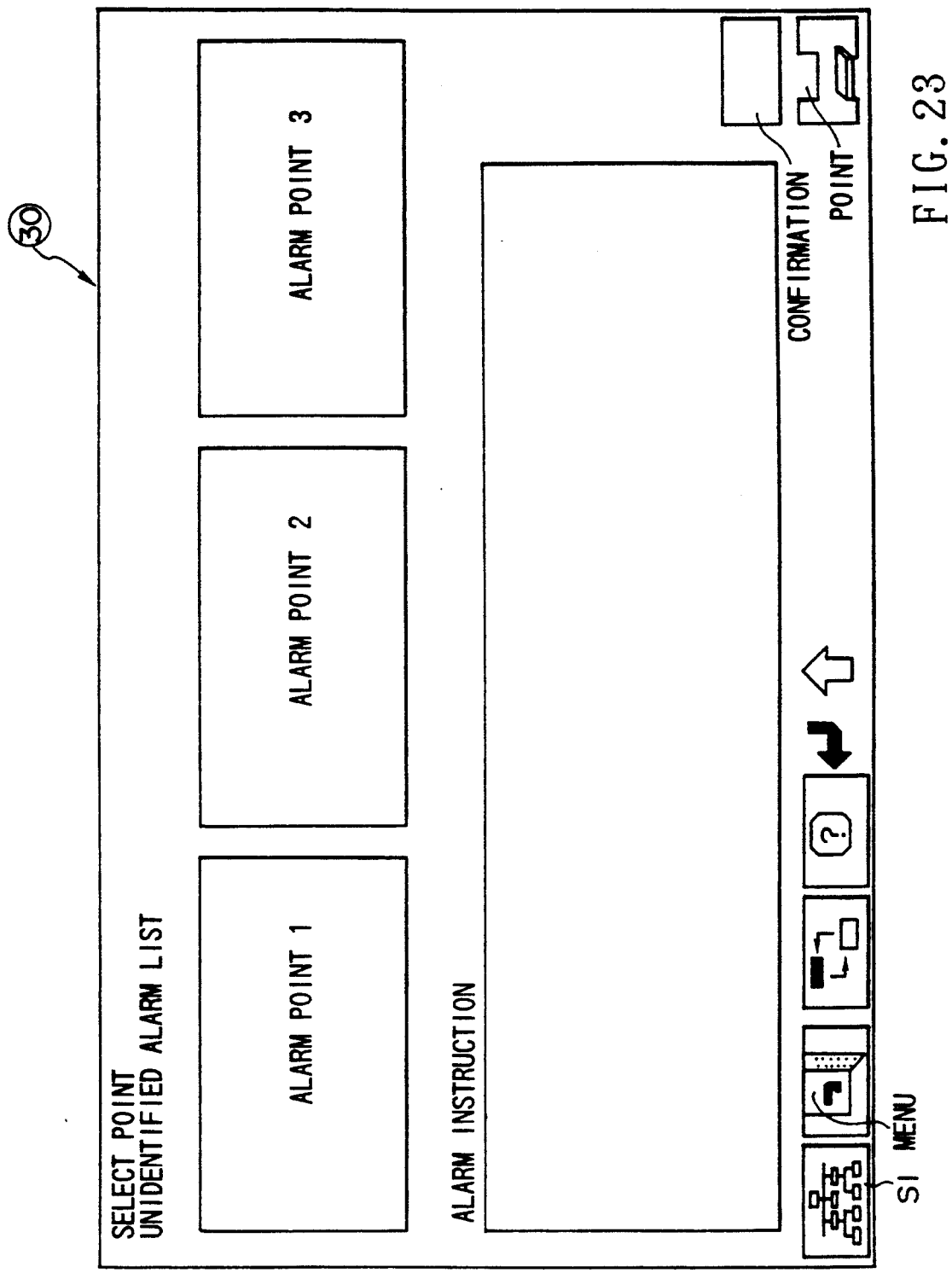
Figure 24:
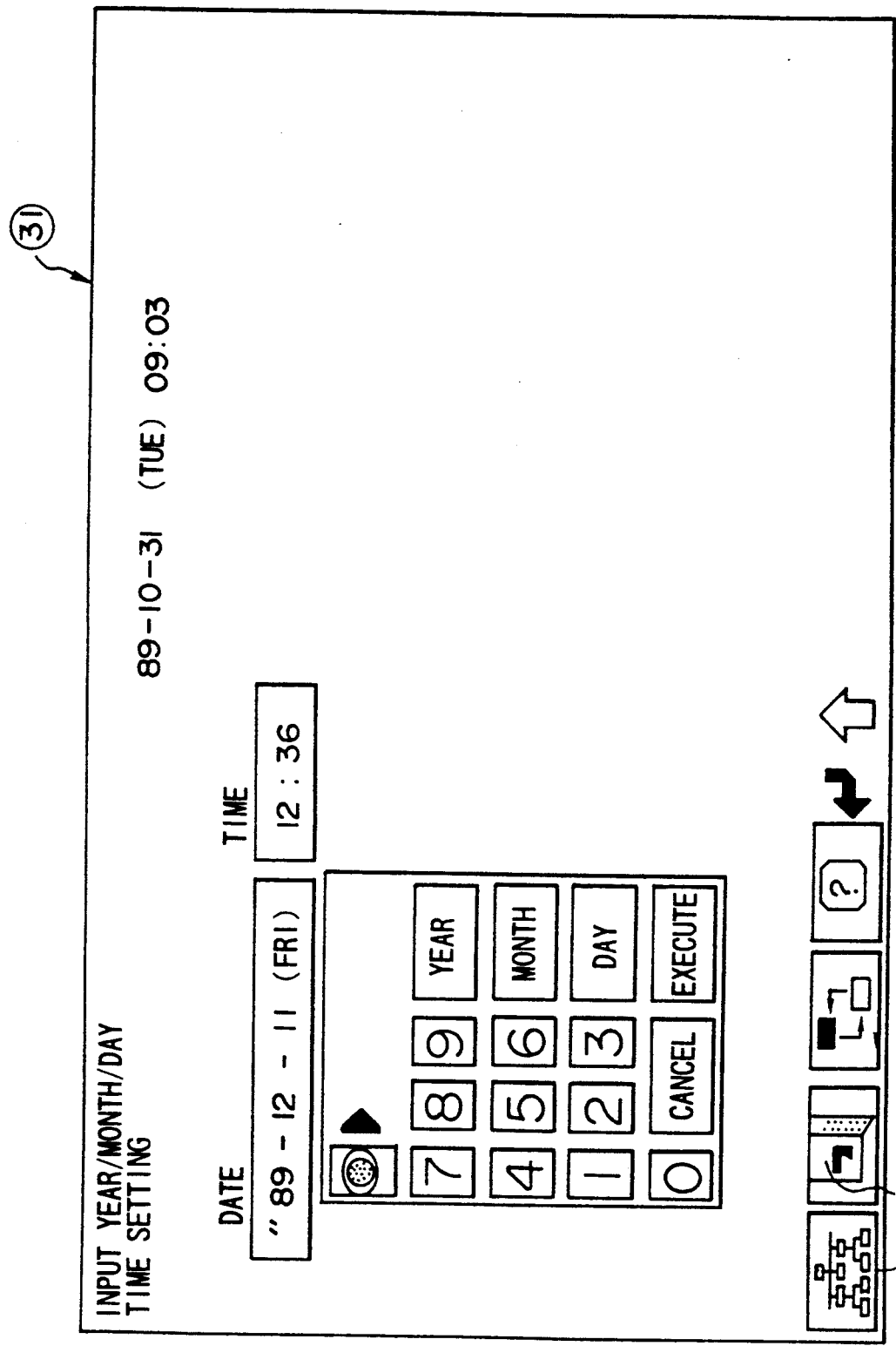
Figure 27:
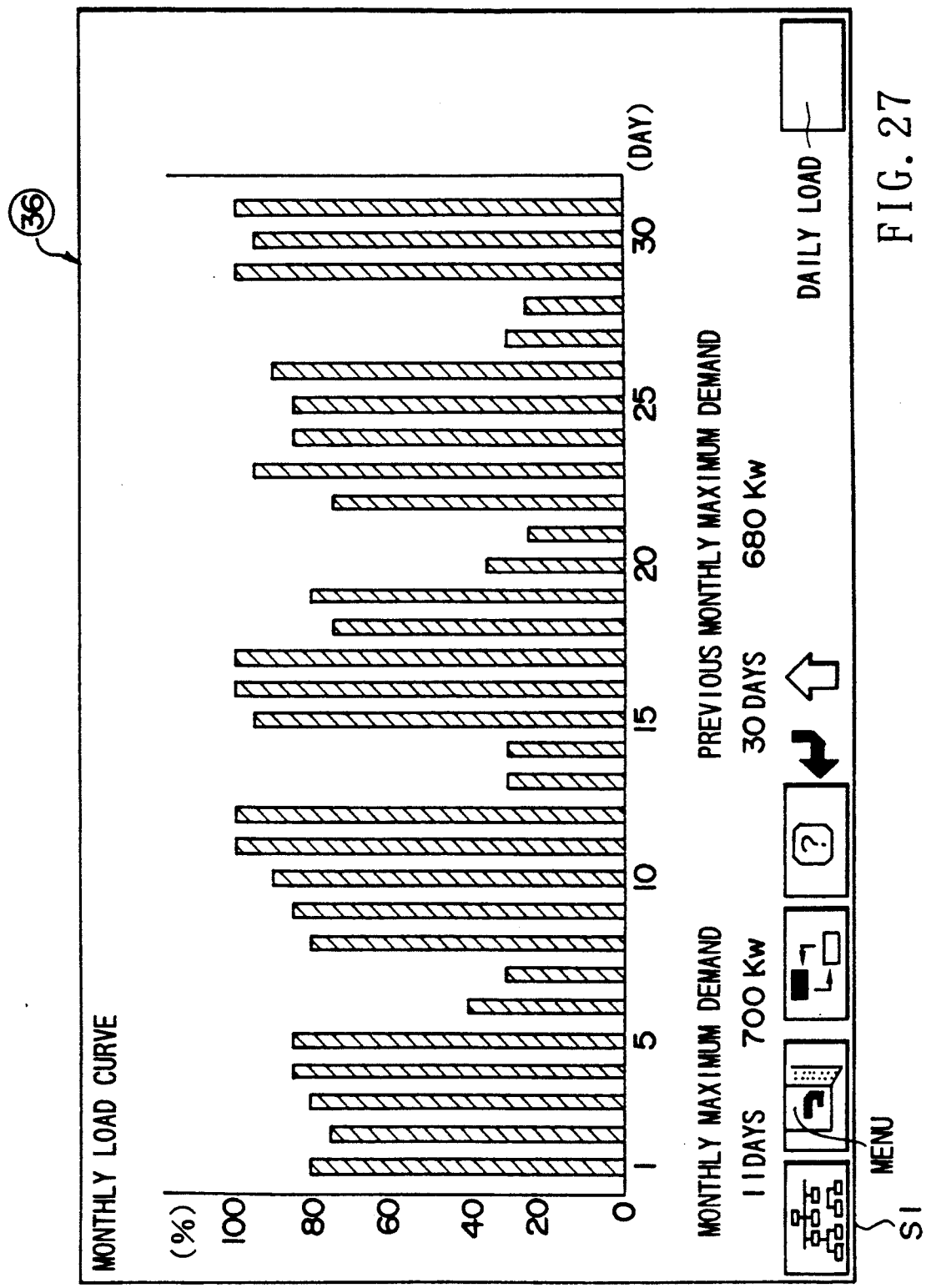
Figure 28:
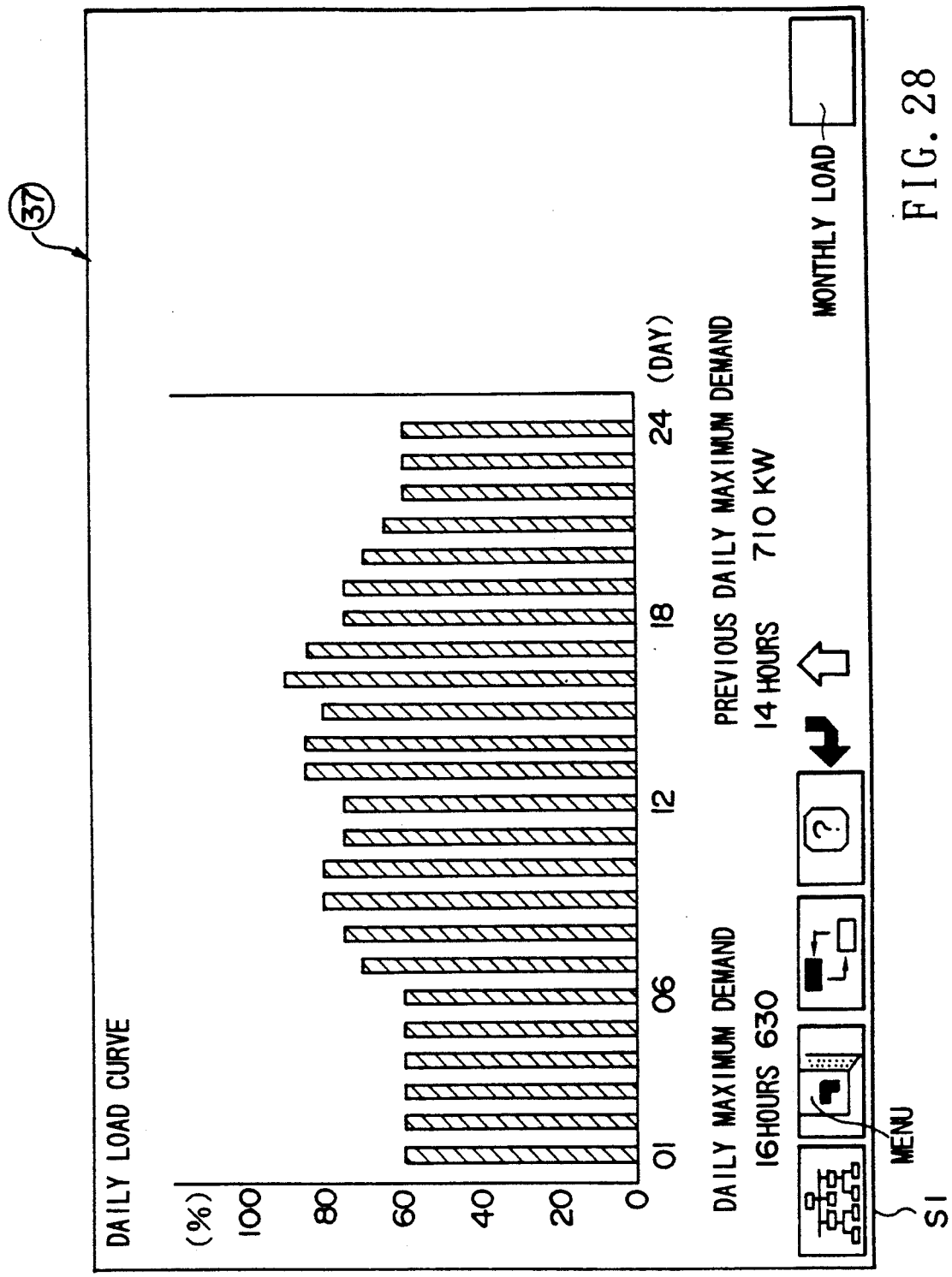
Figure 29:
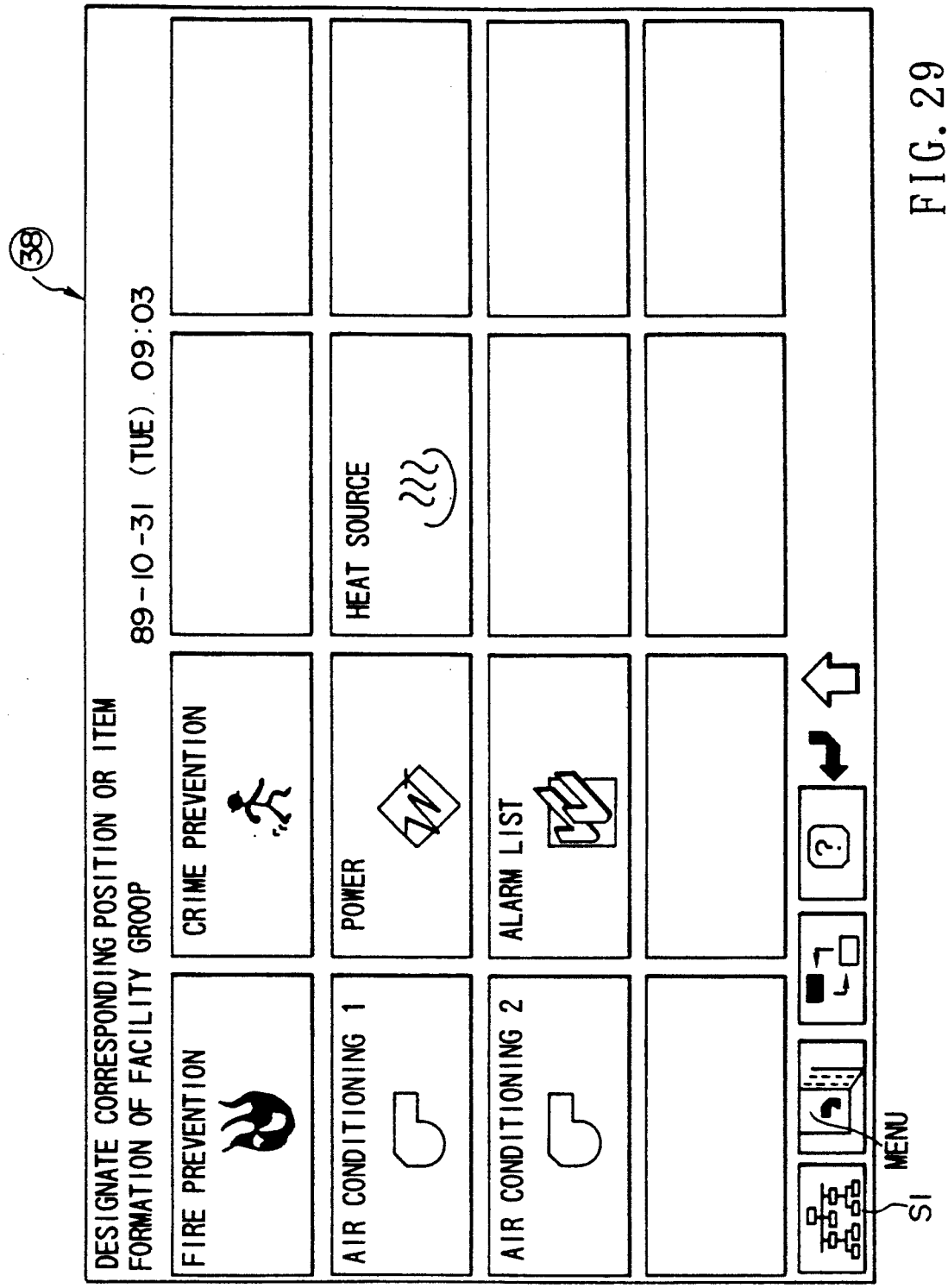
Figure 30:
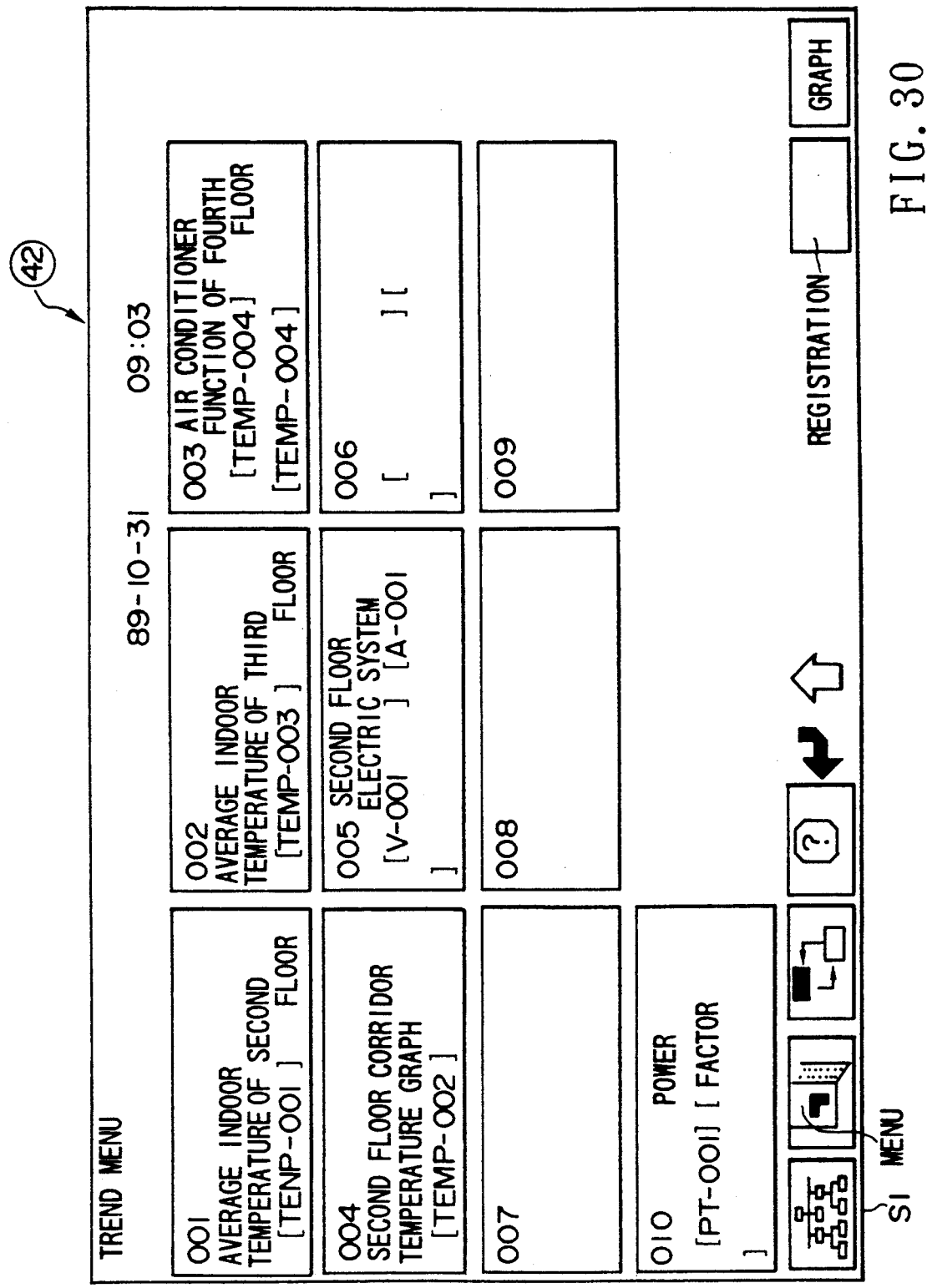
Figure 31:
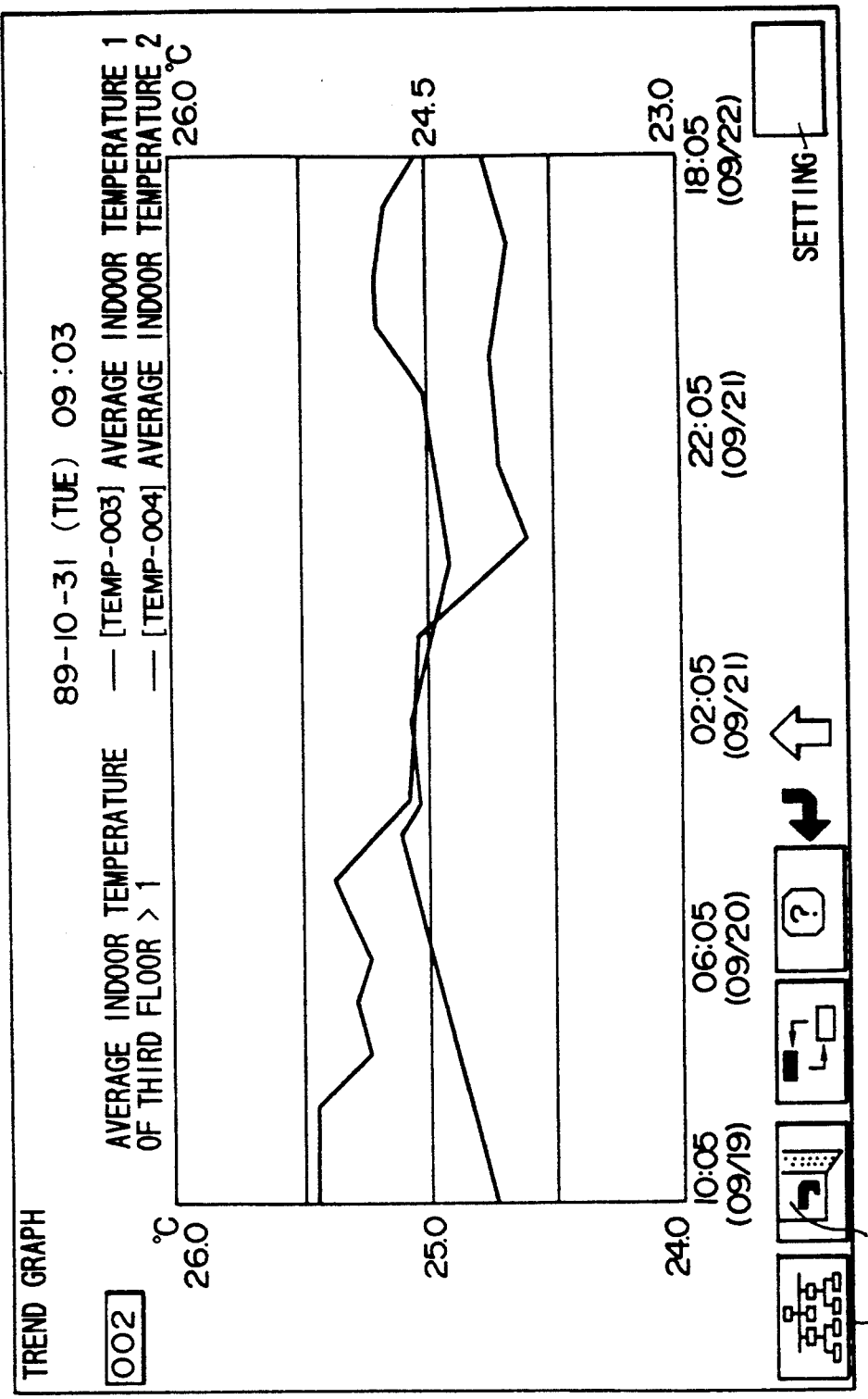
Figure 32:
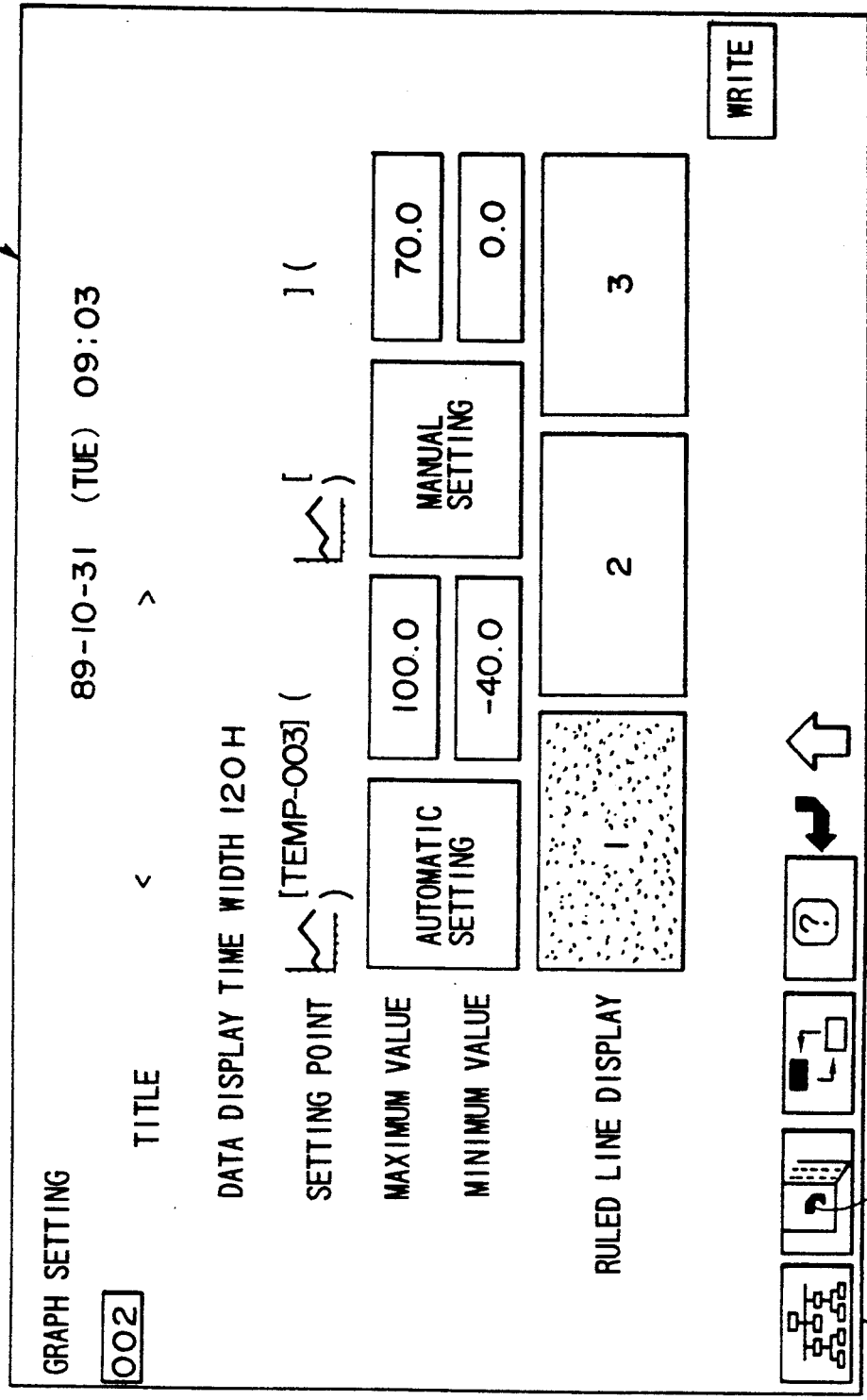
Figure 35:
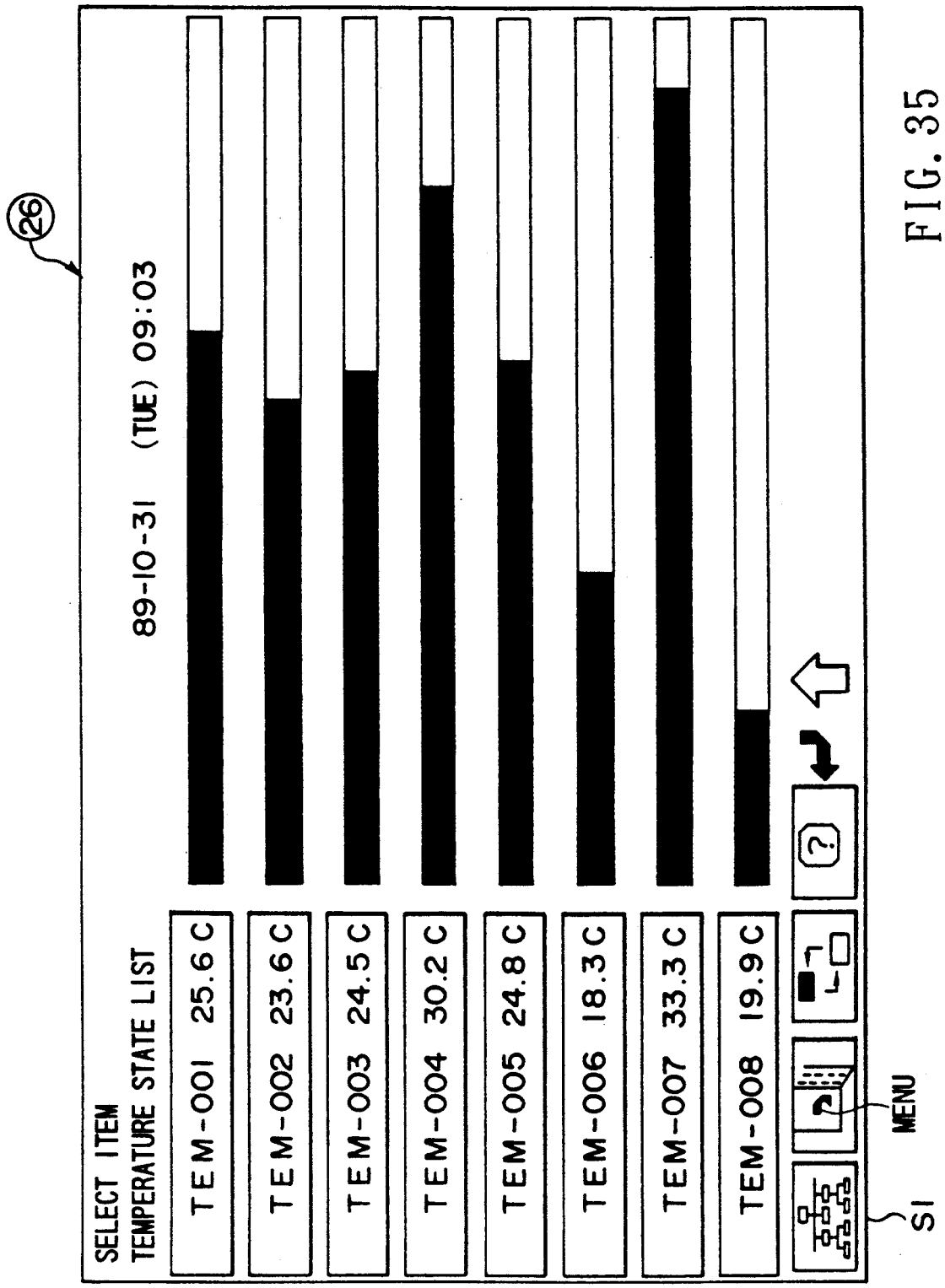
Figure 36:
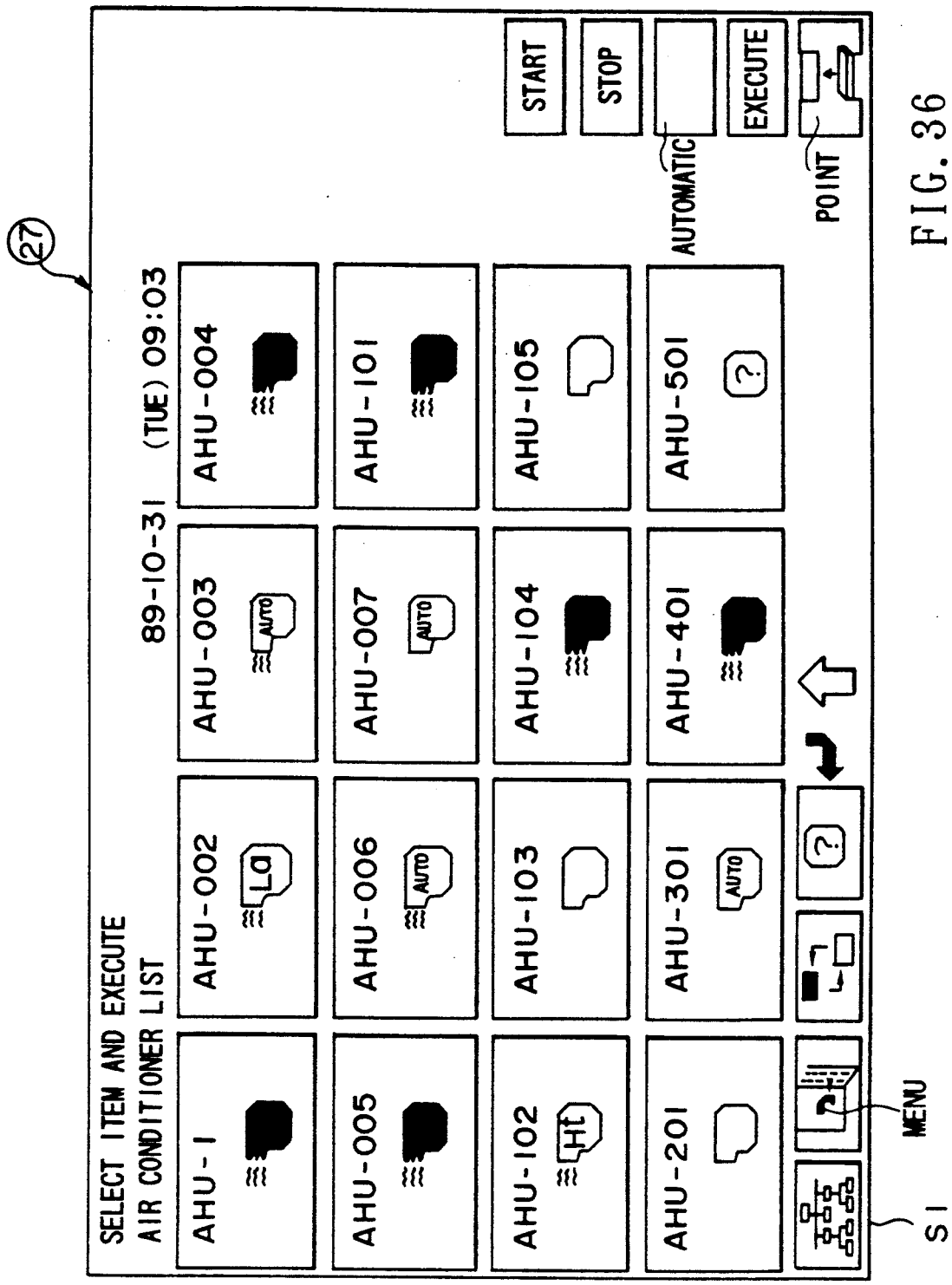

When the savic apparatus 10 is to be started (step 401), the panel surface of the LCD 1 with the touch panel is directly touched. With this operation, a login screen 100 shown in FIG. 5 appears on the screen of the LCD 1 (step 402). A ten-key pad 100a is displayed on the login screen 100. A password is input by using this ten-key pad 100. Upon this input operation of the password, the operation range of the savic apparatus 10, i.e., the management range of a user, is defined. When the password is input through the login screen 100, the screen of the LCD 1 is shifted to a facility overview screen 101 (step 403). Pictorial symbols (to be referred to as icons hereinafter) 101-1 to 101-6 indicating classifications of various types of facility systems are displayed on the facility overview screen 101. If, for example, an icon 101-4 indicating a power facility system is touched, a power system screen 101 shown in FIG. 1 appears as an individual facility system screen (step 404). The power system screen 102 includes a point display section 102-1 constituted by icons 102-11 to 102-17 indicating various points in the power facility system, a first associated screen pull-down section 102-2 constituted by icons 102-21 to 102-23 indicating various types of associated graph menus, and a second associated screen pull-down section 102-3 constituted by icons 102-31 to 102-34 indicating various types of control program menus. When a given icon in the point display section 102-1 is selected and touched, detailed information of a point indicated by the touched icon, i.e., a control monitor point, is displayed on the screen upon a pull-down operation (step 405). If, for example, the icon 102-14 is touched, a one-point information screen 103 shown in FIG. 7 appears. When a given icon in the associated screen pull-down section 102-2 is selected and touched, detailed information of an associated graph menu indicated by the touched icon is displayed upon a pull-down operation (step 406). A control state of the power facility system can be monitored on the basis of the displayed detailed information (e.g., a trend graph and a bar graph). If, for example, the icon 102-21 is touched, a bar/line graph screen 104 shown in FIG. 8 appears. When a given icon in the associated screen pull-down section 102-3 is selected and touched, detailed information of an associated control program menu indicated by the touched icon is displayed upon a pull-down operation (step 407). Control setting of the power facility system can be performed by, e.g., updating the set contents of the displayed detailed information. If, for example, the icon 102-34 is touched, a demand curve screen 105 shown in FIG. 9 appears.

Figure 1:
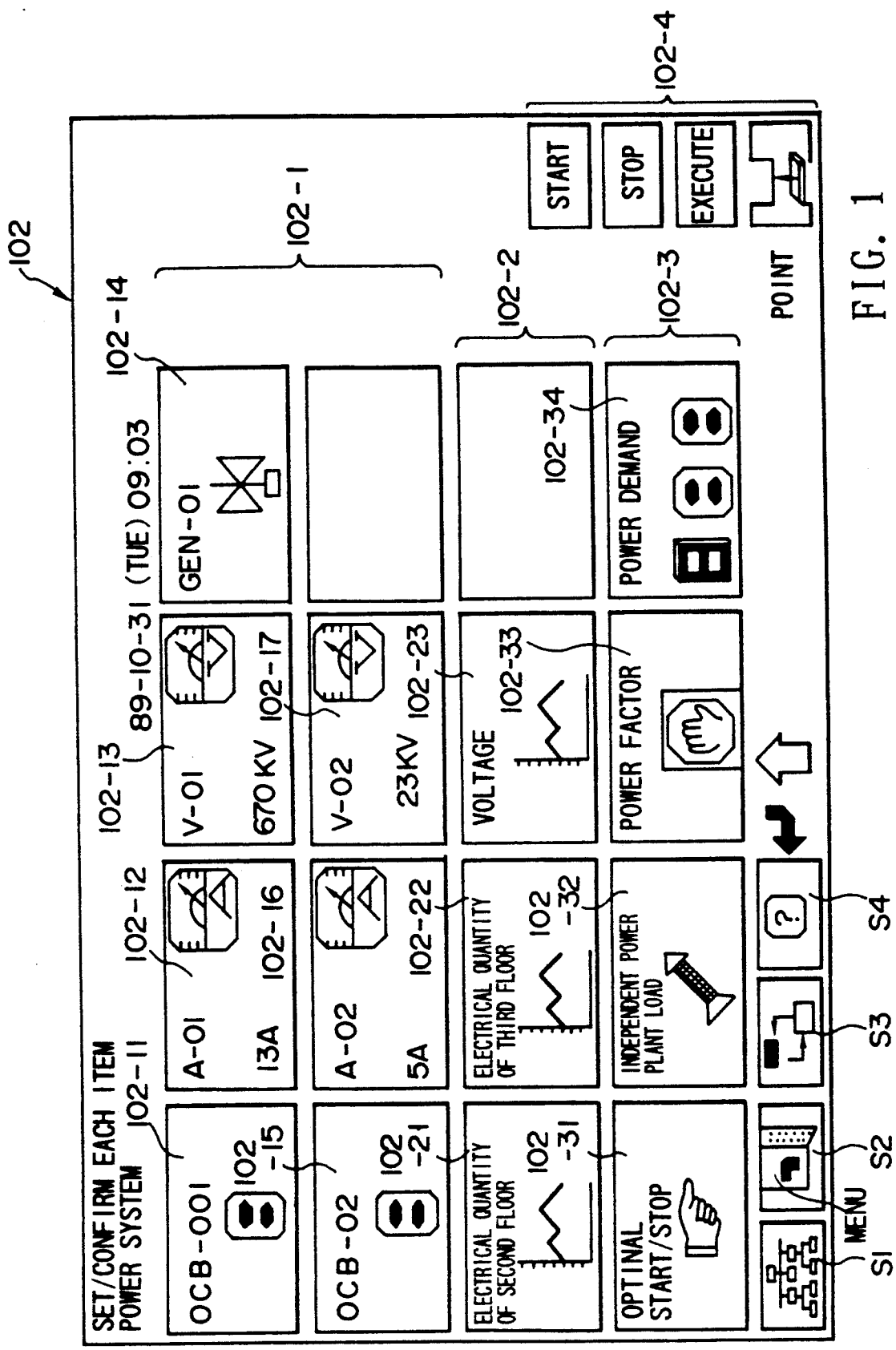
FIG. 1 is a view showing a power system screen displayed on an LCD with a touch panel in a savic apparatus shown in FIG. 2.

If a given icon is selected from the point display section 102-1 on the screen 102 shown in FIG. 1, and one of operation keys 102-4 respectively indicated by icons on the lower right corner on the screen is selected (step 408), a control command can be issued to the selected point.

Figure 6:
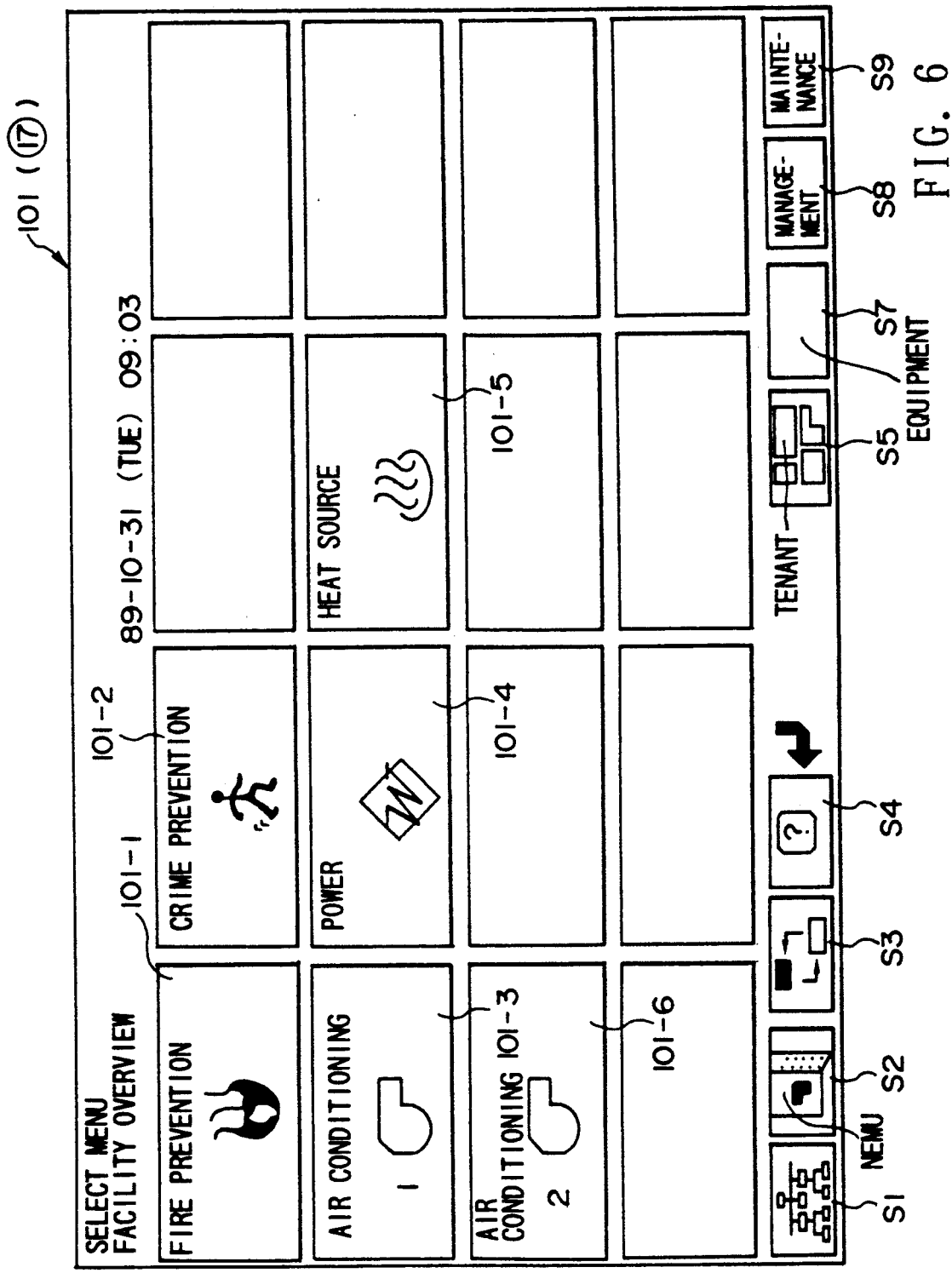
FIG. 6 is a view showing a facility overview screen.

In addition, if a hierarchy screen pull-down symbol S1 indicated by an icon on the lower left corner on the screen 102 is touched, a first-page screen 106a of a hierarchy screen 106 having first to seventh pages respectively shown in FIGS. 10(a) to 10(g) is displayed upon a pull-down operation. If a facility overview tag 106-2 on the screen 106a is touched (step 409), a facility overview screen 101 shown in FIG. 6 appears.

If a tenant overview tag 106-1, an equipment overview tag 106-3, a management overview tag 106-4, and a maintenance overview tag 106-5 are touched on the hierarchy screen 106, a tenant overview screen 107, an equipment overview screen 108, a management overview screen 109, and a maintenance overview screen 110 respectively shown in FIGS. 11, 12, 13, and 14 appear. Subsequently, when the constituent tags of the hierarchy screen 106 are selected and touched, screens corresponding to the selected tags are displayed upon pull-down operations. FIGS. 15 to 37 show examples of screens to be displayed upon pull-down operations. Encircled numbers as screen numbers are respectively appended to the screens shown in FIG. 1, FIGS. 6 to 9, and FIGS. 11 to 14. In addition, these encircled numbers are written in the respective tags of the hierarchy screen 106. With this arrangement, when a given tag is touched, a corresponding screen is displayed upon a pull-down operation.

Note that if tenant screen symbols S5, a facility screen symbol S6, an equipment screen symbol S7, a management screen symbol S8, and a maintenance screen symbol S9 respectively indicated by icons displayed on right corner portions of the maintenance overview screen 110 are touched, the tenant overview screen 107, the facility overview screen 101, the equipment overview screen 108, the management overview screen 109, and the maintenance overview screen 110 can be immediately displayed upon pull-down operations. In addition, the hierarchy screen pull-down symbol S1 is displayed on each screen except for the login screen 100. If the hierarchy screen pull-down symbol S1 is touched, a pull-down operation to the first-page screen 106a of the hierarchy screen 106 can be performed from any screen. In this embodiment, when such a pull-down operation is performed, a tag indicating the contents displayed on the screen before the pull-down operation to the screen 106a is reversely displayed in thick lines or diagonal lines on the hierarchy screen 106. Note that symbols S2, S3, and S4 displayed near the hierarchy screen pull-down symbol S1 are pull-down symbols to be used to shift the current screen to a symbol list screen, a screen pull-down history display, a screen description display, respectively.

As is apparent from the above description, according to the facility management apparatus of the present invention, when a facility system is designated to display a corresponding individual facility system screen, and a desired control monitor point is designated in a point display section on the individual facility system screen, detailed information of the point is displayed upon a pull-down operation. In addition, if a desired associated menu is designated in an associated screen pull-down section on the individual facility system screen, detailed information of the associated menu is displayed upon a pull-down operation.

With this arrangement, a point list, an associated graph list, an associated control program list, and the like need not be selected and displayed on the screen one by one. When a desired control monitor point or associated menu is to be displayed upon a pull-down operation, reactions can be reduced in number.

In addition, on an individual facility system screen, control monitor points and an associated menu of a corresponding facility system are displayed in a point display section and an associated screen pull-down section. Therefore, only pieces of information necessary for the respective operators of various types of facility systems are displayed. This reduces the load of each operator.

What is claimed is:

1. A facility management apparatus for allowing operator control of a facility having a plurality of individual facility systems, said apparatus comprising:
    a computer means for receiving input from, and transmitting control signals to, said individual facility systems;
    said computer means having a touch-responsive display means for displaying a facility overview screen having icons representing said individual facility systems, and for displaying an individual facility system screen upon touch selection of one of said individual facility system icons;
    said individual facility system screens including,
        a single point display portion displaying icons representative of control monitor points associated with said selected individual facility system, wherein a corresponding single point information screen is displayed on said display upon touch selection of one of said control monitor point icons;
        a first associated screen portion displaying icons representative of a plurality of graphic displays associated with said selected individual facility system, wherein a corresponding graphic display screen is displayed on said display upon touch selection of one of said graphic display; and
        a second associated screen portion displaying icons representative of a plurality of control point menu displays associated with said selected individual facility system, wherein a corresponding control point screen is displayed on said display upon touch selection of one of said control point menu icons.

2. The facility management apparatus of claim 1, wherein said individual facility system display further includes an operation display portion for displaying icons representative of command options for controlling said selected individual facility system.

3. The facility management apparatus of claim 2, wherein said command options includes start and stop options for, respectively, starting and stopping said selected individual facility system.

4. The facility management apparatus of claim 1, wherein each of said display screens includes a hierarchy icon, wherein a facility system hierarchy display is provided on said display screen upon touch selection of said hierarchy icon.

5. The facility management apparatus of claim 4, with said hierarchy display including a hierarchical arrangement of display icons representing accessible displays screens, wherein a corresponding individual display screen is displayed upon touch selection of one of said display icons, such that the various screens displayable by the apparatus are accessible through selection of hierarchically arranged icons.

6. The facility management apparatus of claim 1, wherein said touch-responsive display means comprises a touch-responsive LCD display.

7. The facility management apparatus of claim 1, wherein said computer means and said touch-responsive display means are provided within a single housing.

8. The facility management apparatus of claim 7, further including a printer mounted within said housing.

9. The facility management apparatus of claim 1, further including an annunciator, said annunciator being operably connected to said computer means and including
    a plurality of touch-sensitive display sections, each corresponding to one of said control points within said facility;
    a pair of LED indicators adjacent to each of said display sections for providing a visual indication of an operational state of said corresponding control point;
    a secondary display for displaying information associated with a control point, wherein said information is retrieved from said computer means and displayed within said secondary display upon touch-selection of one of said touch sensitive display sections.

10. A facility management apparatus for allowing operator control of a facility having a plurality of individual facility systems, said apparatus comprising:
    a computer means for receiving input from, and transmitting control signals to, said individual facility systems;
    said computer means having a touch-responsive display means for displaying a facility overview screen having icons representing said individual facility systems, and for displaying an individual facility system screen upon touch selection of one of said individual facility system icons;
    said individual facility system screens each including, one or more of,
        a single point display portion displaying icons representative of control monitor points associated with said selected individual facility system, wherein a corresponding single point information screen is displayed on said display upon touch selection of one of said control monitor point icons;
        a first associated screen portion displaying icons representative of a plurality of graphic displays associated with said selected individual facility system, wherein a corresponding graphic display screen is displayed on said display upon touch selection of one of said graphic display;

a second associated screen portion displaying icons representative of a plurality of control point menu displays associated with said selected individual facility system, wherein a corresponding control point screen is displayed on said display upon touch selection of one of said control point menu icons; and an operation display portion for displaying icons representative of stop and start command options for controlling said selected individual facility system.

11. A facility management apparatus for allowing operator control of a facility having a plurality of individual facility systems, said apparatus comprising:

means for receiving input from said individual facility systems;

computer means, mounted within a housing, for processing said input to determine the status of said individual facility systems;

a touch-responsive display means, operably connected to said computer means, for displaying icons representing said individual facility systems, and for displaying an individual facility system screen upon touch selection of one of said individual facility system icons; said individual facility system screens each including a single point display portion displaying icons representative of control monitor points associated with said selected individual facility system, wherein a corresponding single point information screen is displayed on said display upon touch selection of one of said control monitor point icons;

a first associated screen portion displaying icons representative of a plurality of graphic displays associated with said selected individual facility system, wherein a corresponding graphic display screen is displayed on said display upon touch selection of one of said graphic display; and a second associated screen portion displaying icons representative of a plurality of control point menu displays associated with said selected individual facility system, wherein a corresponding control point screen is displayed on said display upon touch selection of one of said control point menu icons, said control point screen including control icons for allowing user entered selection of commands for controlling said selected individual facility system; and, output means for transmitting control signals to said selected individual facility system in response to said user entered commands.

* * * * *